(12) United States Patent
Bhattad et al.

(10) Patent No.: US 11,329,769 B2
(45) Date of Patent: May 10, 2022

(54) TECHNIQUES FOR CONTENTION WINDOW ADJUSTMENT

(71) Applicant: QUALCOMM Incorporated, San Diego, CA (US)

(72) Inventors: Kapil Bhattad, Bangalore (IN); Xiaoxia Zhang, San Diego, CA (US); Maarten Menzo Wentink, Nijmegen (NL); Marco Papaleo, Bologna (IT); Jing Sun, San Diego, CA (US); Pravjyot Singh Deogun, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/930,177

(22) Filed: Jul. 15, 2020

(65) Prior Publication Data

US 2021/0036811 A1 Feb. 4, 2021

(30) Foreign Application Priority Data

Aug. 1, 2019 (IN) .............................. 201941031145

(51) Int. Cl.
*H04L 1/18* (2006.01)
*H04W 74/08* (2009.01)

(52) U.S. Cl.
CPC ....... *H04L 1/1832* (2013.01); *H04W 74/0808* (2013.01)

(58) Field of Classification Search
None
See application file for complete search history.

(56) References Cited

U.S. PATENT DOCUMENTS

| 2019/0037601 | A1* | 1/2019 | Noh ................... H04L 27/0006 |
| 2019/0159256 | A1 | 5/2019 | Talarico et al. |
| 2020/0236709 | A1* | 7/2020 | Park ......................... H04L 5/00 |
| 2020/0344819 | A1* | 10/2020 | Myung ............. H04W 74/0808 |
| 2020/0374933 | A1* | 11/2020 | Lou ..................... H04W 74/006 |
| 2021/0037567 | A1* | 2/2021 | Bhattad ............. H04W 74/0808 |
| 2021/0266963 | A1* | 8/2021 | Noh ...................... H04W 76/11 |

OTHER PUBLICATIONS

Huawei, et al., "Contention Window Size Adjustment for UL Category 4 LBT for eLAA", 3GPP Draft, 3GPP TSG RAN WG1 Meeting #84bis, R1-162129, 3rd Generation Partnership Project (3GPP), Mobile Competence Centre; 650, Route Des Lucioles; F-06921 Sophia-Antipolis Cedex; France, vol. RAN WG1, No. Busan, Korea; Apr. 2, 2016, XP051079976, 4 Pages, Apr. 11, 2016-Apr. 15, 2016, Retrieved from the Internet: URL: http://www.3gpp.org/ftp/tsg_ran/WG1_RL1/TSGR1_84b/Docs/ [retrieved on Apr. 2, 2016], section 3.
International Search Report and Written Opinion—PCT/US2020/042406—ISAEPO—dated Sep. 21, 2020.
(Continued)

*Primary Examiner* — Anh Vu H Ly
(74) *Attorney, Agent, or Firm* — Arent Fox LLP

(57) ABSTRACT

Techniques for a node to adjust or update its CW are provided. The node transmits at least one transmission during a channel occupancy time (COT). The node can determine or adjust a contention window (CW) size following the end of COT based on whether feedback for a transmission is received or could be scheduled during the COT.

30 Claims, 21 Drawing Sheets

(56) References Cited

OTHER PUBLICATIONS

Samsung: "Channel Access Procedures for NR-U", 3GPP Draft, 3GPP TSG-RAN WG1 Meeting #97, R1-1906920—Channel Access Procedures for NR-U, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728370, 12 Pages, Retrieved from the Internet: URL: http://www.3gpp.org/ftp/Meetings%5F3GPP%5FSYNC/RAN1/Docs/R1%2D1906920%2Ezip, [retrieved on May 13, 2019], paragraph [0004].

* cited by examiner

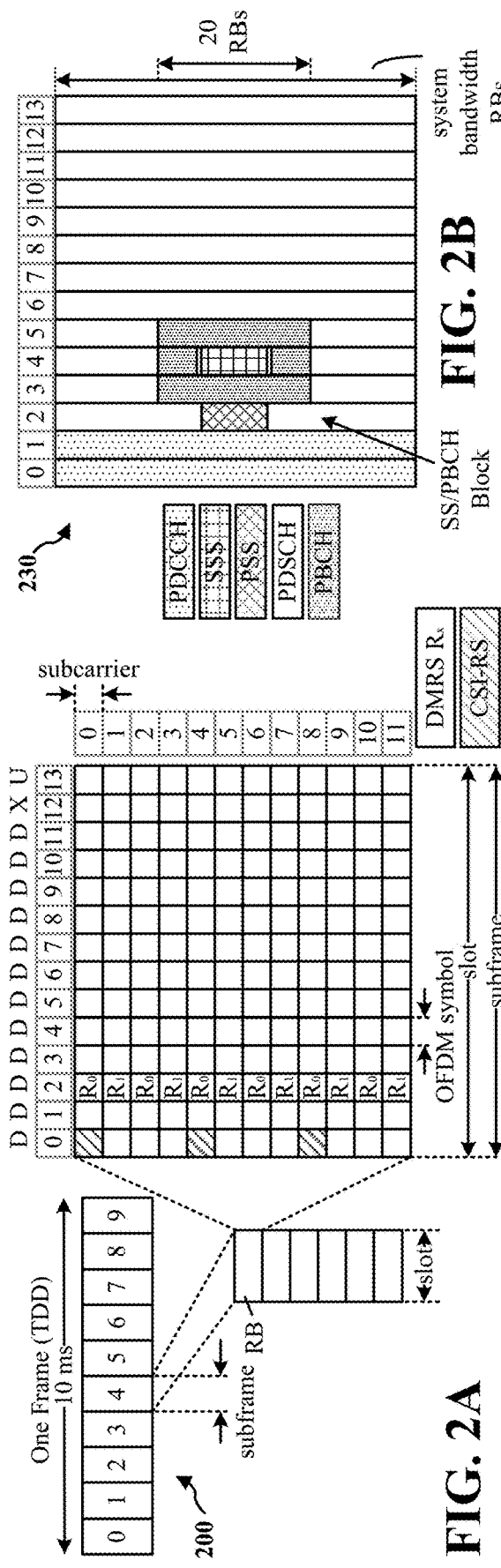
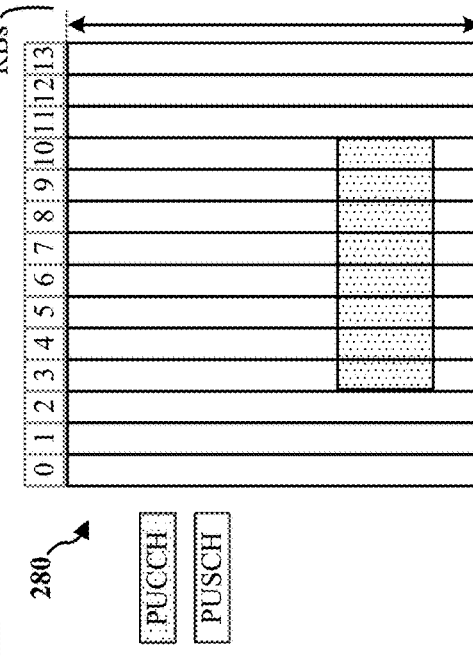
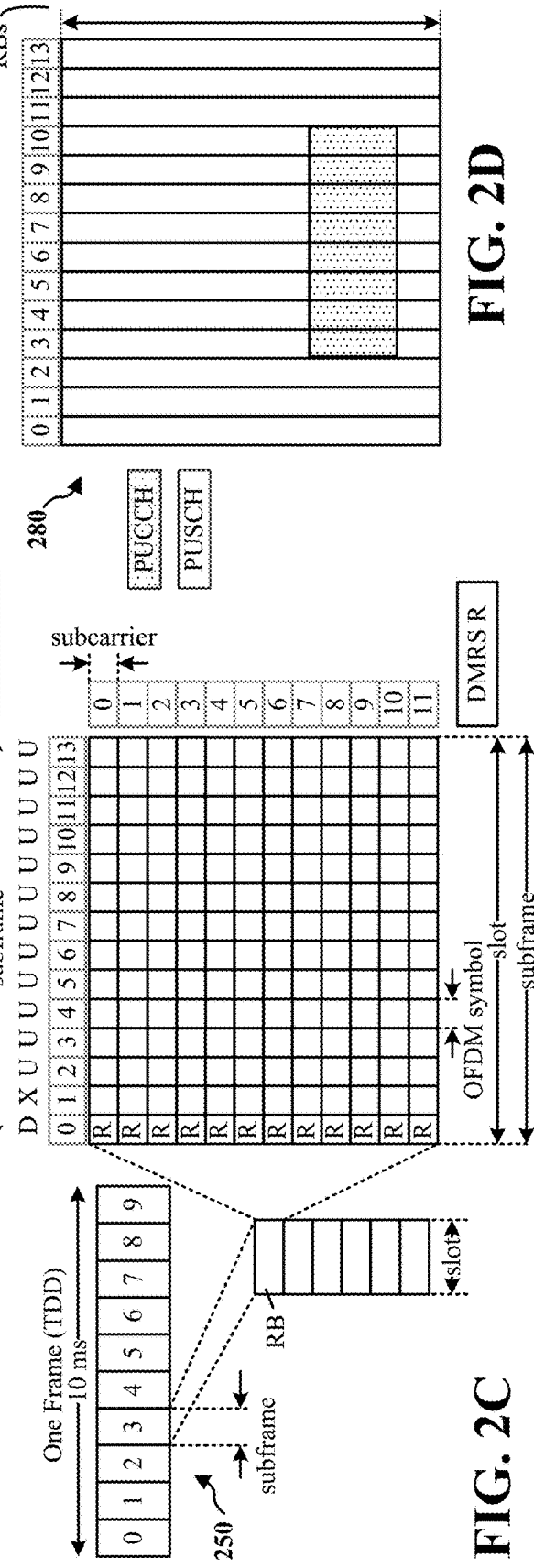
FIG. 2A  FIG. 2B  FIG. 2C  FIG. 2D

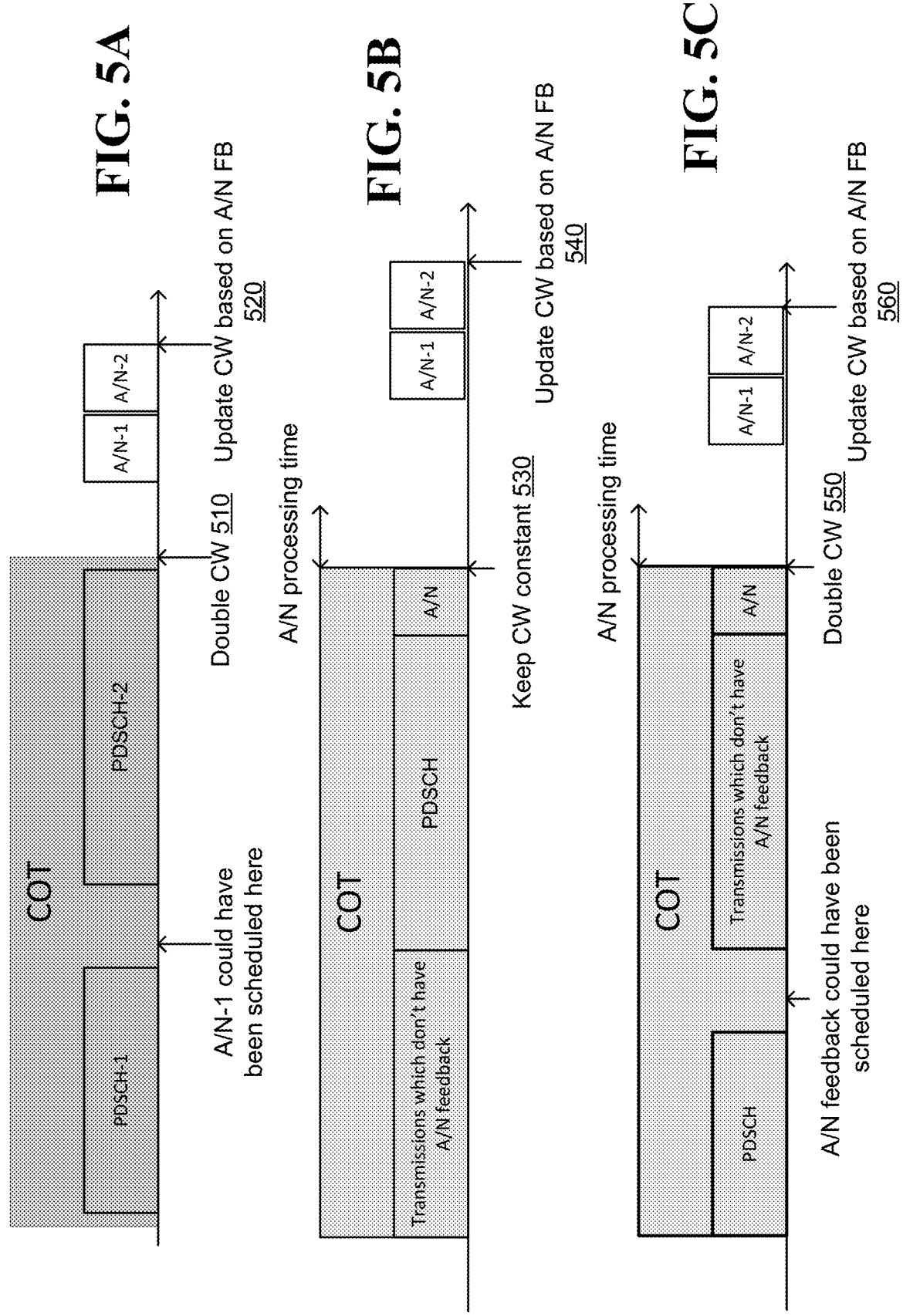

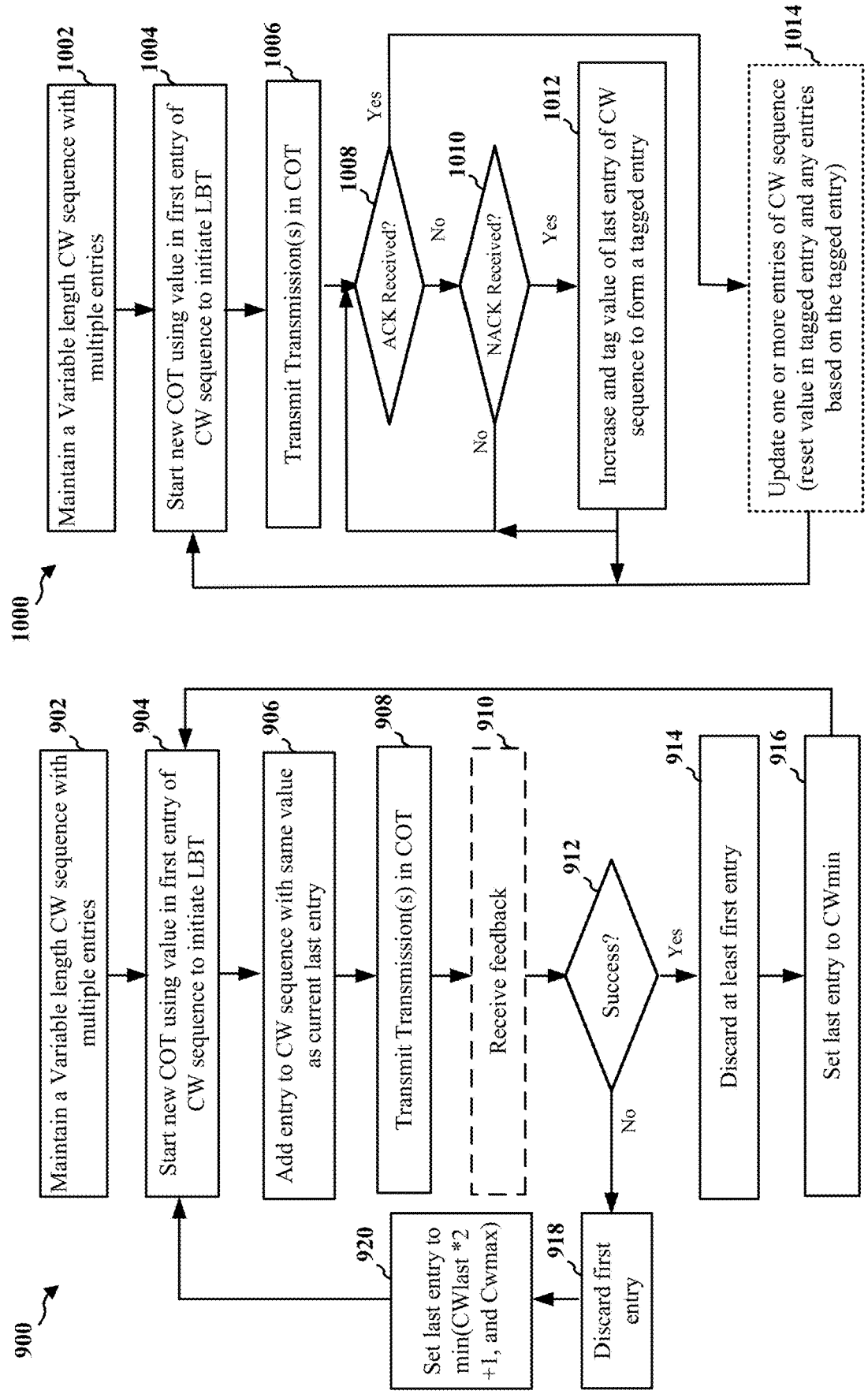

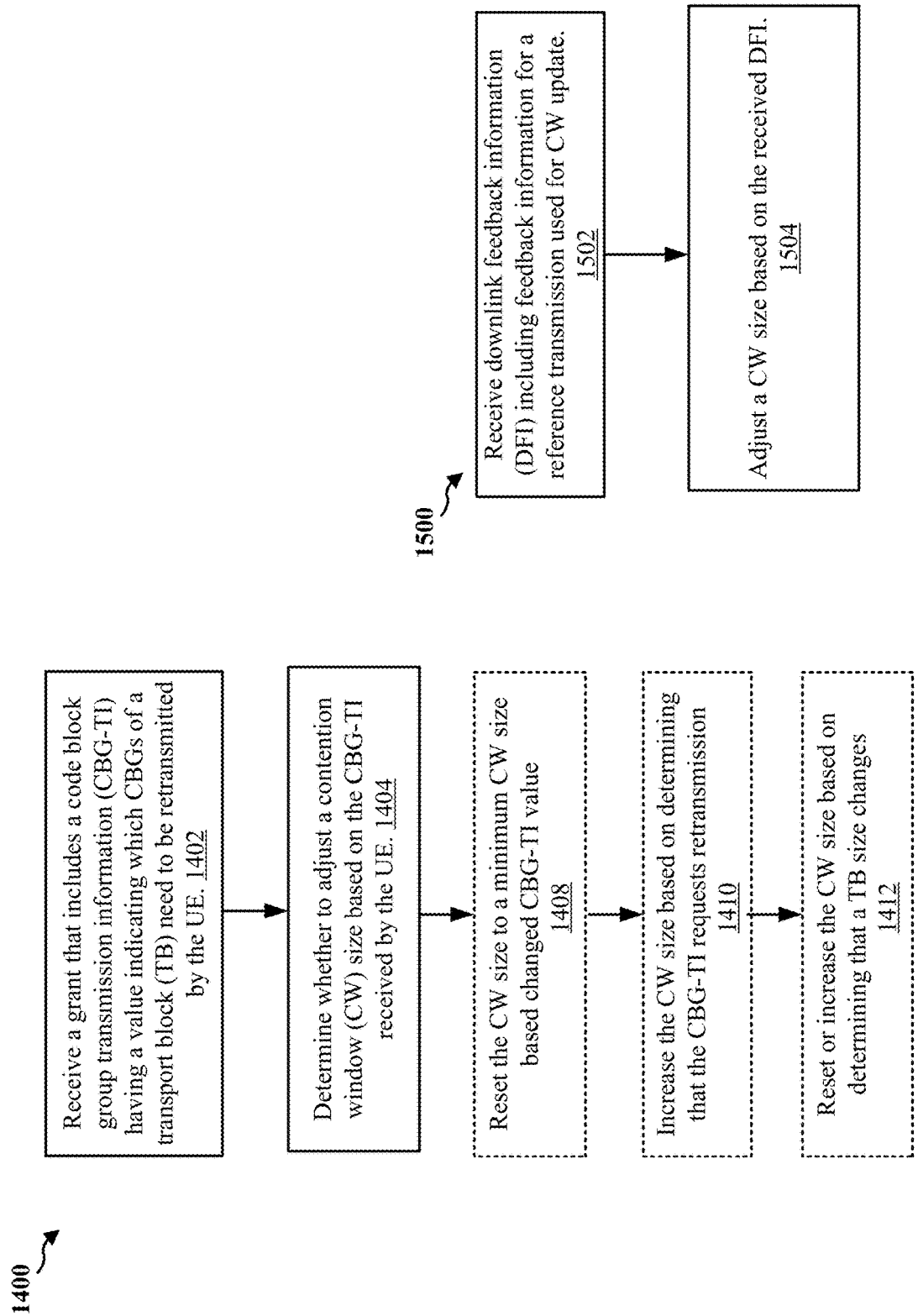

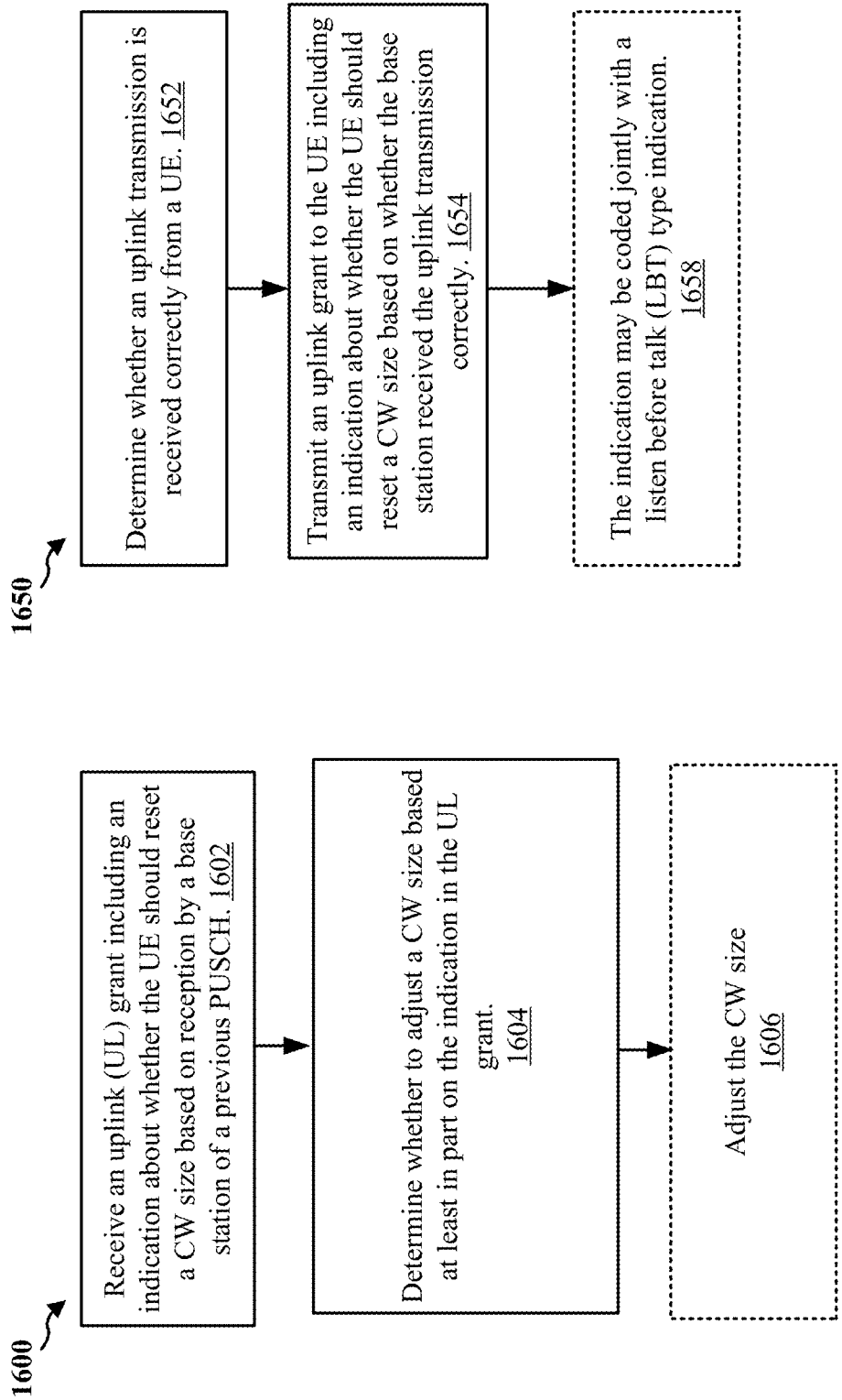

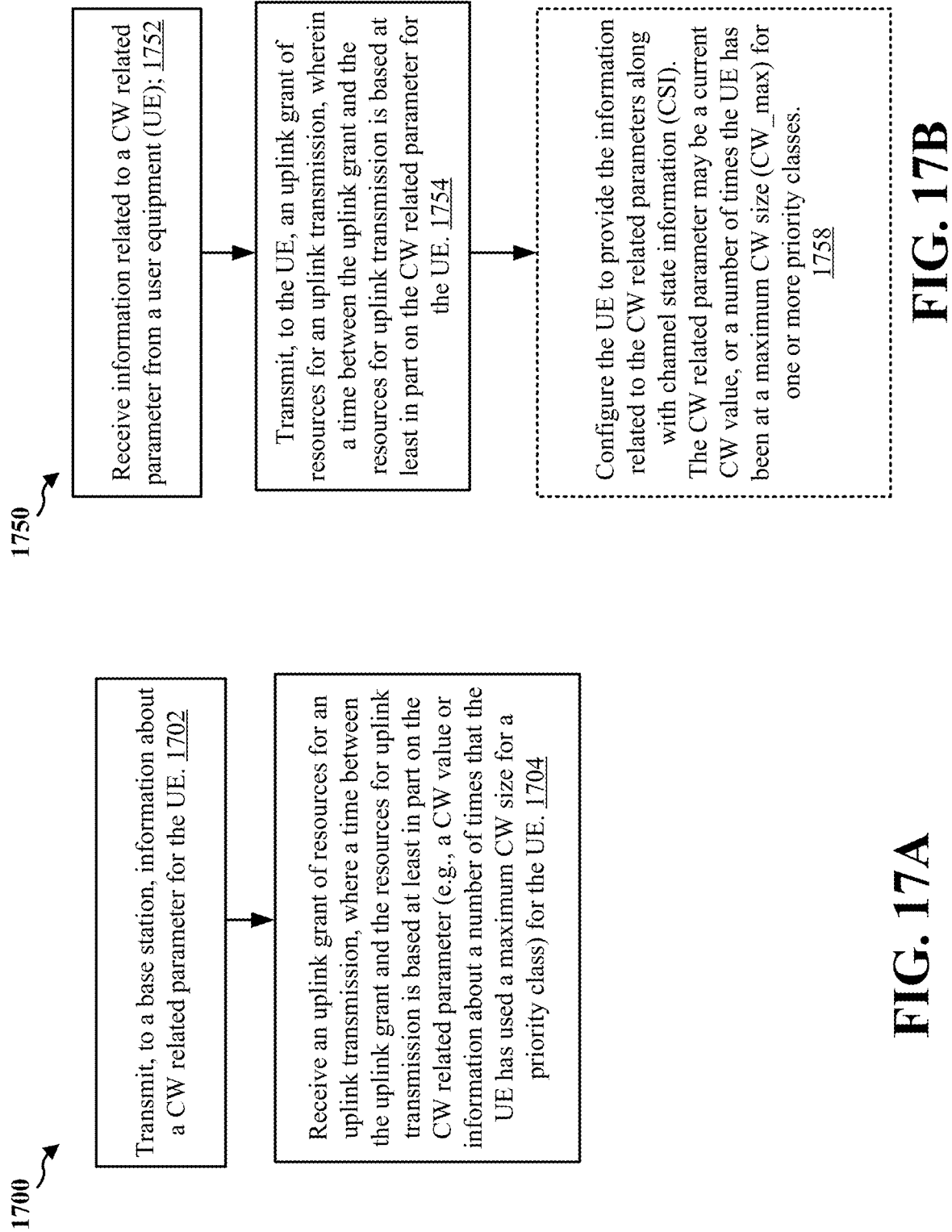

TECHNIQUES FOR CONTENTION WINDOW ADJUSTMENT

CLAIM OF PRIORITY UNDER 35 U.S.C. § 119

The present Application for Patent claims priority to Indian Patent Application No. 201941031145, entitled "TECHNIQUES FOR CONTENTION WINDOW ADJUSTMENT" filed Aug. 1, 2019, which is assigned to the assignee hereof and hereby expressly incorporated by reference herein for all purposes.

BACKGROUND

Technical Field

The present disclosure relates generally to communication systems, and more particularly, to techniques for adjusting or updating contention window size or value.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low-latency communications (URLLC).

Licensed Assisted Access (LAA) brings together licensed spectrum and un-licensed spectrum to create higher capacity than can be offered by licensed spectrum alone. Increasing network capacity is vital in addressing the exponential growth of data traffic in cellular networks. LAA in 5G new radio, unlicensed (NR-U) has new requirements and features.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Techniques are provided relating to contention window (CW) adjustment or update. In an aspect of the disclosure, a method, a computer-readable medium, and an apparatus are provided for wireless communication at a base station. An apparatus may determine to adjust/update the CW size at an end of channel occupancy time (COT) and whenever a positive acknowledgement (ACK)/negative acknowledgement (NACK) feedback is received for a reference transmission. For example, the apparatus may double the CW size when a NACK is received for one or more reference transmissions, may assign CW with a minimum CW value (CW_min) when a ACK is received for one or more reference transmissions, and/or the like.

In another aspect of the disclosure, a method, a computer-readable medium, and an apparatus are provided for wireless communication. According to one example, the apparatus transmits at least one data transmission during a COT. The apparatus determines a CW size following the COT based on whether feedback for the at least one data transmission could be scheduled during the COT.

In another aspect of the disclosure, a method, a computer-readable medium, and an apparatus are provided for wireless communication. The apparatus uses a CW sequence that includes multiple entries and having a variable length, each entry having a CW value. The apparatus transmits at least one data transmission during a COT and receives ACK/NACK feedback for the at least one data transmission. The apparatus updates the CW sequence based on the ACK/NACK feedback for the at least one data transmission transmitted during the COT or after a predetermined time delay. The apparatus uses a first entry in the CW sequence to perform a listen before talk (LBT) process.

In another aspect of the disclosure, a method, a computer-readable medium, and an apparatus are provided for wireless communication. The apparatus maintains a CW sequence that includes multiple entries and having a variable length, each entry having a CW value. The apparatus transmits multiple data transmissions during a COT and receives a first ACK/NACK feedback for the multiple data transmissions. The apparatus determines whether to update the CW sequence based on the first ACK/NACK feedback for at least one of the multiple data transmissions transmitted during the COT.

In another aspect of the disclosure, a method, a computer-readable medium, and an apparatus are provided for wireless communication. The apparatus transmits multiple data transmissions during at least one COT and determines whether to adjust a CW size based on an ACK/NACK feedback for the multiple data transmissions transmitted during the COT.

In another aspect of the disclosure, a method, a computer-readable medium, and an apparatus are provided for wireless communication at a user equipment (UE). The apparatus transmits a plurality of uplink transmissions in a COT. The apparatus monitors for feedback within a period of time based on a delay value and determines whether to adjust a CW size based at least in part on whether the feedback is received during the period of time based on the delay value.

In another aspect of the disclosure, a method, a computer-readable medium, and an apparatus are provided for wireless communication at a user equipment (UE). The apparatus receives a grant that includes a code block group transmission information code block group transmission information (CBG-TI), the CBG-TI having a CBG-TI value indicating which CBGs of a transport block (TB) are to be retransmitted by the UE. The apparatus determines whether to adjust a CW size based on the CBG-TI received by the UE.

In another aspect of the disclosure, a method, a computer-readable medium, and an apparatus are provided for wireless communication at a UE. The apparatus receives downlink feedback information (DFI), the DFI including feedback information for a reference transmission used for a CW update and adjusts a CW size based on the DFI.

In another aspect of the disclosure, a method, a computer-readable medium, and an apparatus are provided for wireless communication at a UE. The apparatus receives an uplink (UL) grant including an indication about whether the UE should reset the CW size based on reception by a base station of a previous uplink shared channel transmission and determines whether to adjust the CW size based at least in part on the indication in the UL grant.

In another aspect of the disclosure, a method, a computer-readable medium, and an apparatus are provided for wireless communication at a UE. The apparatus determines whether an uplink transmission is received correctly from a UE and transmits an uplink grant to the UE including an indication about whether the UE should reset a CW size based whether the base station received the uplink transmission correctly.

In another aspect of the disclosure, a method, a computer-readable medium, and an apparatus are provided for wireless communication at a UE. The apparatus transmits, to a base station, information about a CW related parameter for the UE and receives an uplink grant of resources for an uplink transmission, wherein a time between the uplink grant of resources and the uplink transmission is based at least in part on the CW related parameter for the UE.

In another aspect of the disclosure, a method, a computer-readable medium, and an apparatus are provided for wireless communication at a base station. The apparatus receives an information related to a CW related parameter from a UE and transmits, to the UE, an uplink grant of resources for an uplink transmission, wherein a time between the uplink grant of resources and the uplink transmission is based at least in part on the CW related parameter for the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, downlink channels within a 5G/NR subframe, a second 5G/NR frame, and UL channels within a 5G/NR subframe, respectively.

FIG. 5A illustrates a timeline of an example of a CW adjustment technique that may be used at the end of a COT according to one example.

FIG. 5B illustrates a timeline of an example of a CW adjustment technique that may be used at the end of a COT according to another example.

FIG. 5C illustrates a timeline of an example of a CW adjustment technique that may be used at the end of a COT according to another example.

FIG. 9 is a flowchart of a method of wireless communication according to a first example.

FIG. 10 is a flowchart of a method of wireless communication according to a second example.

FIG. 14 is a flowchart of a method of wireless communication according to a fifth example.

FIG. 15 is a flowchart of a method of wireless communication according to a sixth example.

FIG. 16A is a flowchart of a method of wireless communication according to a seventh example.

FIG. 16B is a flowchart of a method of wireless communication according to an eighth example.

FIG. 17A is a flowchart of a method of wireless communication according to a ninth example.

FIG. 17B is a flowchart of a method of wireless communication according to a tenth example.

DETAILED DESCRIPTION

Figure 1:
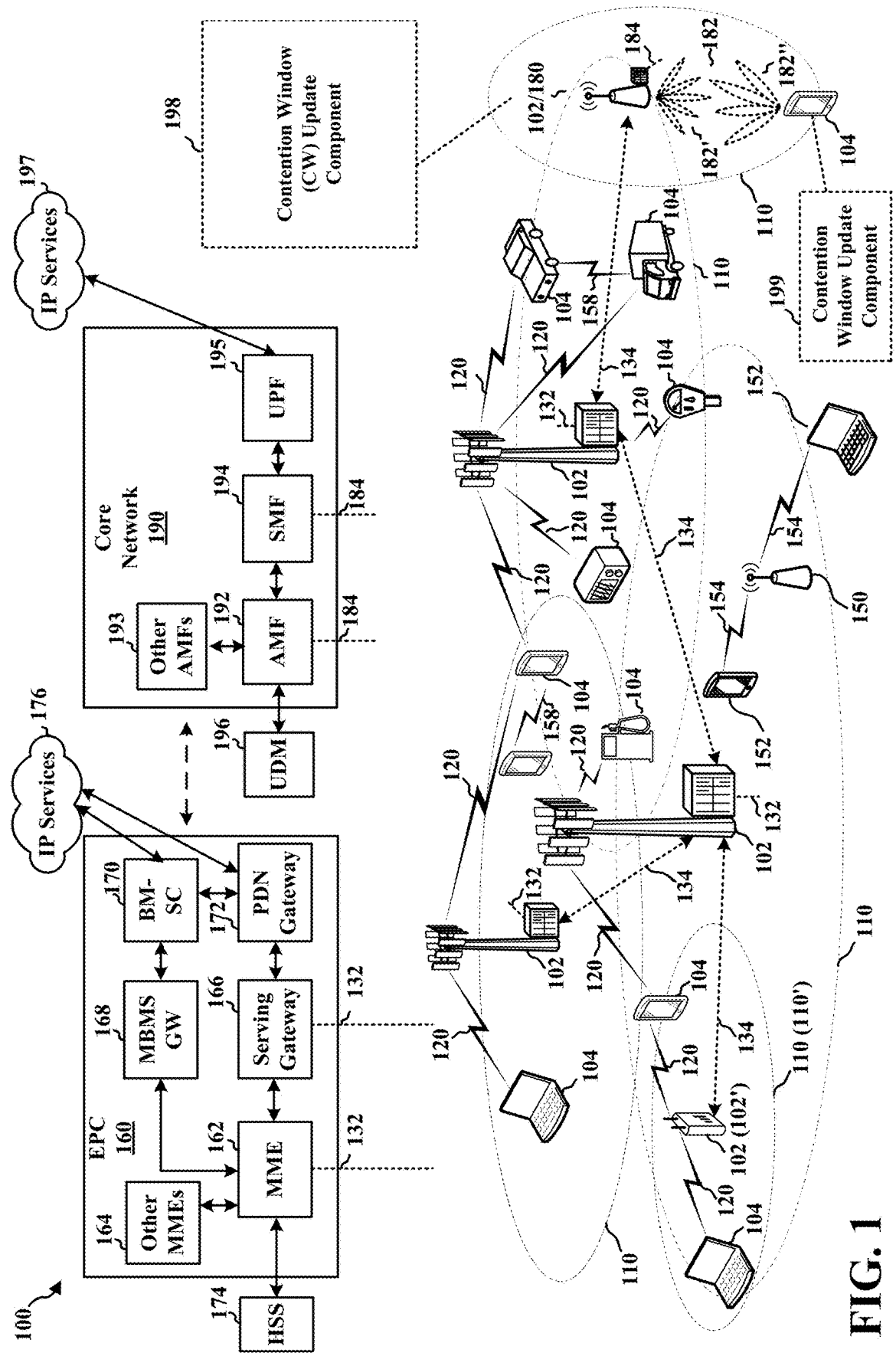
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may comprise a contention window component 199 configured to implement one or more techniques for CW update/adjustment based on multiple feedback arriving at different times, based on CBG-TI, based on DFI, based on UL grant, based on CW information, etc. Referring again to FIG. 1, in other aspects, a base station 102/180 may comprise a contention window component 198 configured to implement one or more techniques for CW update/adjustment based on feedback scheduling, based on LBT process, based on CW sequence, based on Multi-feedback, based on UL grant, based on CW information, etc.

Referring again to FIG. 1, in certain aspects, the UE 104 may be configured to implement one or more techniques and may comprise the contention window update component 199 for determining a CW size following COT based on whether feedback for a downlink transmission could be scheduled during the COT.

FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
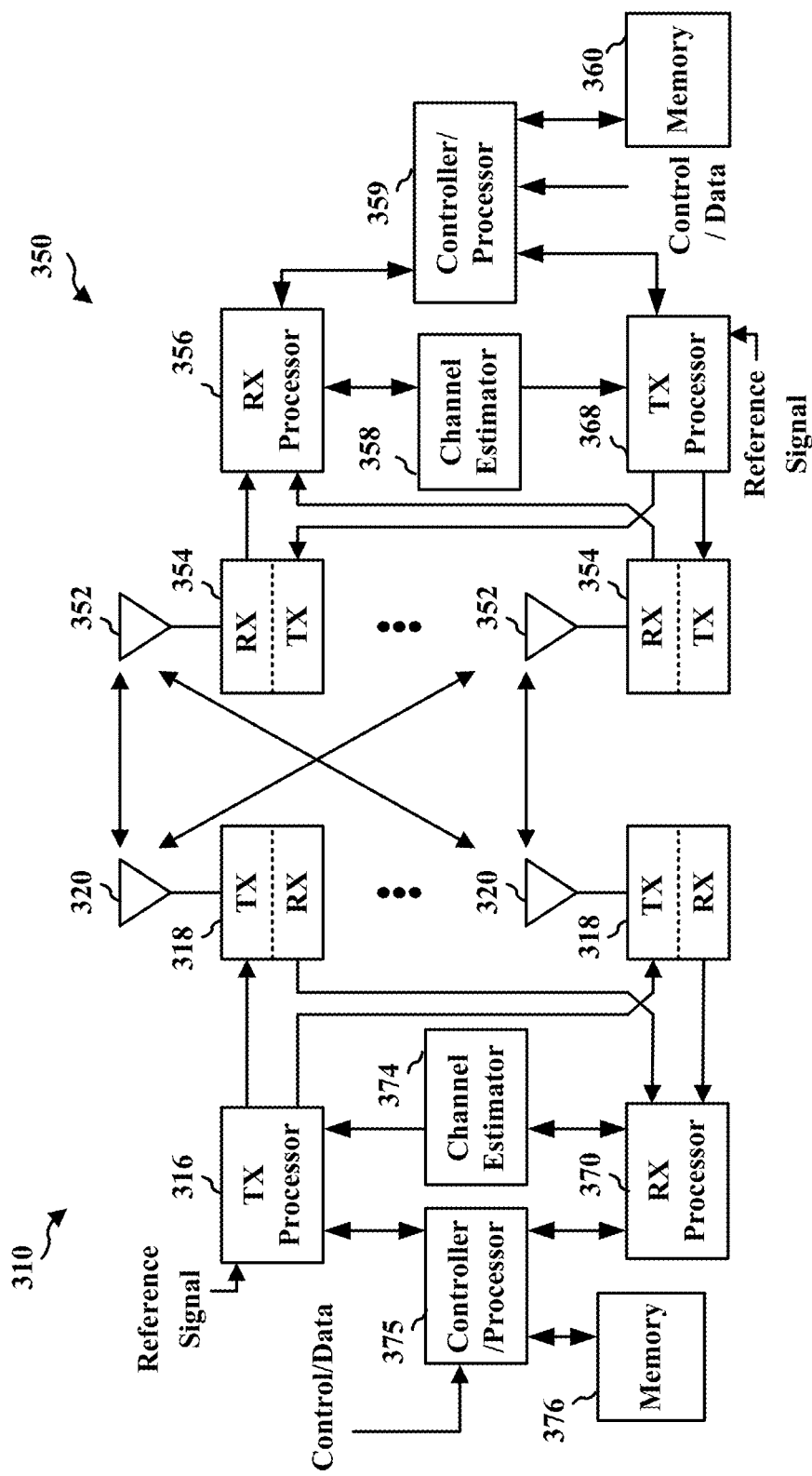
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Spectrum sharing provides access to shared and unlicensed spectrum that has the benefits of higher capacity, higher spectrum utilization, and new deployments. These deployments may include licensed spectrum aggregation the enable enhanced mobile broadband with higher speeds and better user experiences, private networks that provide enterprise services, such as industrial IoT applications, and enhanced local broadband that enable host networks for sports and entertainment venues. For example, LAA brings together licensed spectrum and un-licensed spectrum to create higher capacity than can be offered by licensed spectrum alone.

Prior to gaining access to, and communicating over, a contention-based shared radio frequency spectrum band, a base station or UE may perform a listen before talk (LBT) procedure to contend for access to the shared radio frequency spectrum band. An LBT procedure may include performing a CCA procedure to determine whether a channel of the contention-based shared radio frequency spectrum band is available. When it is determined that the channel of the contention-based shared radio frequency spectrum band is available, a channel reserving signal, such as a channel usage beacon signal (CUBS) may be transmitted to reserve the channel. A CCA procedure to check before using a channel may use energy detection to detect the presence or absence of other signals on the channel in order to determine whether the channel is occupied or clear. A duration for performing the CCA may be based on a CW size, a random backoff, an energy detection threshold, etc. LAA brings together licensed spectrum and un-licensed spectrum to create higher capacity than can be offered by licensed spectrum alone. LAA employs listen before talk (LBT). LBT, which is also known as listen before transmit, is a technique used by a transmitter to first sense the radio environment before starting transmission. CW may be a positive integer that is used to initiate LBT procedure, such as Cat. 4 LBT procedure. A higher CW may result in a higher backoff. The CW may be adjusted based on network conditions. When the network is congested, a sending device receives NACKs or does not receive any acknowledgements. In response to receiving negative feedback or to failing to receive feedback, the device may increase the CW, e.g., by doubling the CW size. When the network is less congested, as indicated by the sending node receiving an ACK, the CW may be decreased (e.g., reset to a minimum value).

At least one of the TX processor 368, the RX processor 356, and the controller/processor 359 may be configured to perform aspects in connection with techniques and may comprise a contention window component 199 for making CW updates or adjustments at UE 104 of FIG. 1. At least one of the TX processor 316, the RX processor 370, and the controller/processor 375 may be configured to perform aspects in connection with techniques 198 for making CW updates or adjustments at base station 102 of FIG. 1. Aspects presented herein address a need for enhanced techniques a base station or UE can utilize to make CW updates or adjustments.

CW Size Adjustment Techniques for UE and Base Station (or Other Nodes of a Wireless Network)

Figure 4:
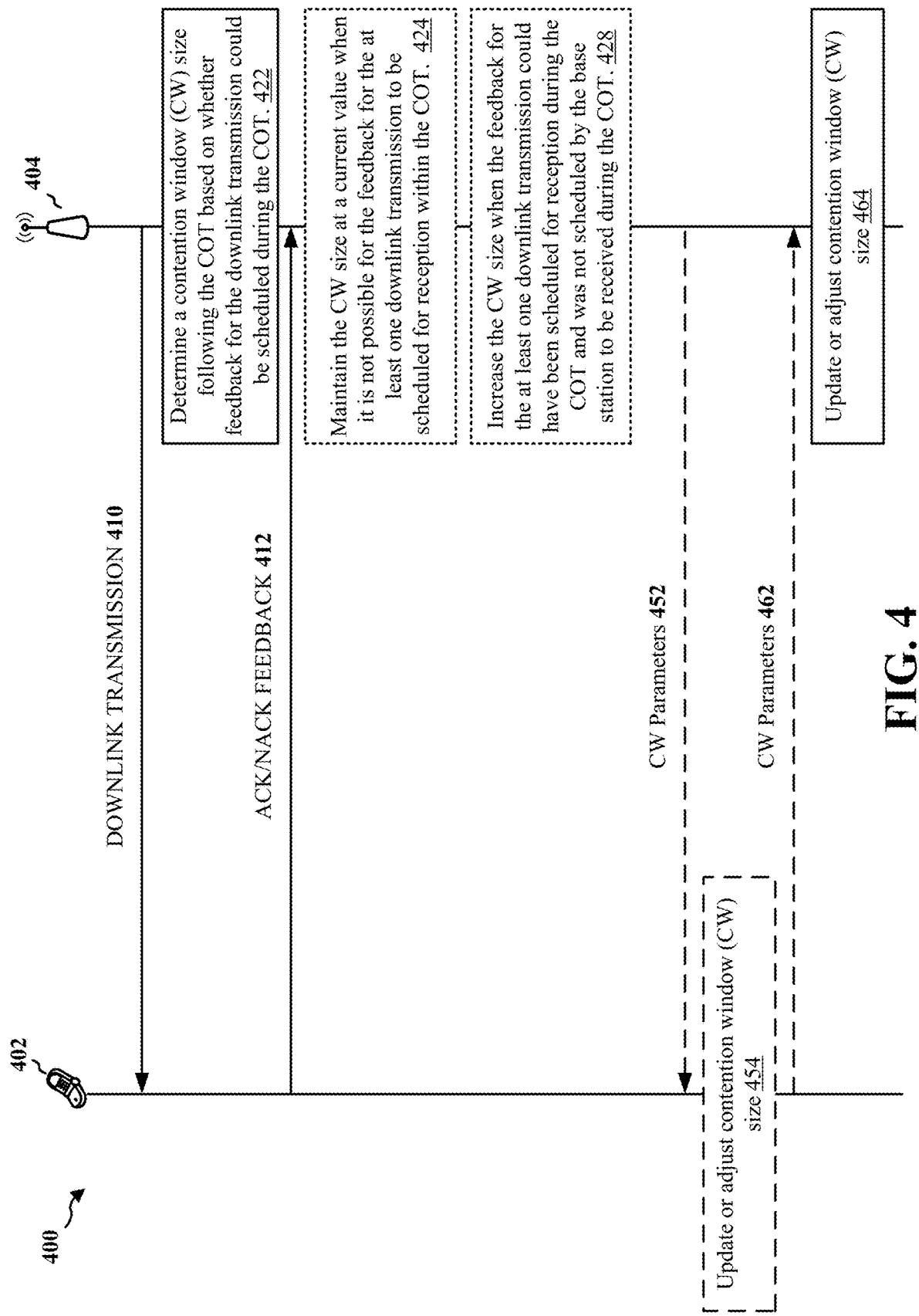
FIG. 4 illustrates a call flow that uses CW size adjustment techniques according to some implementations.

FIG. 4 illustrates call flow 400 that involves CW size adjustment techniques (e.g., 422, 424, 428, 454 and 464) according to some implementations. Although various examples may be described in connection with base station 404, a UE 402 may similarly employ CW size adjustment techniques (e.g., 422, 424, and 428) to adjust or update its CW size or value. At 410, the base station 404 sends one or more downlink transmissions in a TxOp to the UE 402. The downlink transmissions may be, for example, PDCCH or PDSCH transmissions. At 422, the base station 404 may determine a CW size following the COT based on whether feedback for the downlink transmission could have been scheduled by the base station during the COT. In block 424, the base station 404 may maintain the CW size at a current value when it is not possible for the feedback for at least one downlink transmission to have been scheduled for reception within the COT. At 428, the base station increases the CW size when the feedback for the downlink transmission could have been scheduled for reception during the COT and was not scheduled by the base station to be received during the COT. The base station 404 further updates or adjusts its CW size based on receiving one or more ACK/NACK feedback of a downlink transmission, e.g., a reference downlink transmission, which are sent by UE 402 and received by the base station 404 in 412. Techniques to update or adjust CW are described in greater detail below with reference to FIGS. 9, 10, 12-15, 16A, 16B, 17A, and 17B.

Call flow 400 also illustrates the base station 404 sending CW parameters or information to the UE 402 in 452. In block 454, the UE 402 may update or adjust its CW size based on the CW parameters or information, examples of which are described in greater detail below with reference to FIGS. 14, 15, and 16A. In 462, UE 402 may send CW parameters or information to the base station 404. In block 464, the base station may adjust or update its CW size or value based on the CW parameters or information, an example of which is described in greater detail below with reference to FIG. 17B.

The various CW update or adjustment techniques described below may be utilized by the UE 402 or the base station 404. For example, the UE 402 may utilize the techniques described in any of FIGS. 13, 14, 15, 16A and 17A. The base station 404 may utilize the techniques described in any of FIGS. 9, 10, 12, 16B and 17B.

CW Update Based on Whether Feedback Possible in COT

In some cases, due to ACK/NACK processing timeline capability at the base station, when a Cat-4 LBT is to be initiated before processing of feedback is completed, the base station may determine a CW value to use for the LBT. For example, a Cat-4 LBT can include a LBT with random back off with variable size contention window, as defined in certain radio access technologies, such as Wi-Fi, LTE in unlicensed band, NR in unlicensed band, etc. Although aspects are illustrated for a base station, aspects may also be applied by a UE in determining a CW value to use for LBT (e.g., based on feedback for PUSCH transmissions). In one example, the base station may keep the CW value constant until the base station completes the processing of the feedback transmitted at the end of TxOP. In another example, the base station may double or otherwise increase the CW value at the end of the COT without waiting for the base station to finish processing the ACK/NACK feedback transmitted at the end of TxOP. In this example, the base station may reset the CW value subsequently based on ACK feedback received later in time.

In a third example, the base station may double or otherwise increase the CW value if ACK/NACK feedback could have scheduled earlier in COT so that no additional time was required at the base station to process the A/N feedback after COT end. Alternatively, the base station may keep the CW constant if no ACK/NACK feedback could have scheduled earlier in COT so that additional time was required at the base station to process the A/N feedback after COT end and is selectively adjusted when feedback is available and processed.

At the end of COT, the base station may selectively adjust CW based on whether ACK/NACK feedback for a downlink transmission could have been scheduled by the base station in the COT. The base station may increase the CW size when the feedback for the downlink transmission could have been scheduled for reception during the COT and was not scheduled by the base station to be received during the COT as shown in FIG. 5A. In one example, the CW size is increased by doubling its current value 510 at the end of the COT. After ACK/NACK feedback is received and processed by the base station at a subsequent point in time, the CW may be further adjusted based on the ACK/NACK feedback 520. For example, if the CW was increased prior to receiving and/or processing ACK/NACK feedback, the CW may be reduced if an ACK is later received/processed.

FIG. 5B illustrates an example in which the base station may maintain the CW size at a current value 530 because it is not possible for ACK/NACK feedback for the downlink transmission to be scheduled for reception within the COT. In some cases, due to processing timeline capability at UE, ACK/NACK feedback might not be able to be scheduled within a COT. For example, for a 15 KHz SCS and a COT having a single slot, it may not be possible to include ACK/NACK feedback at the end of the COT. The base station may further update or adjust CW at a subsequent time 540 after ACK/NACK feedback has been received and processed. For example, if the CW was increased prior to receiving feedback, the base station may reduce/reset the CW size when an ACK is received by the base station for a previously transmitted downlink transmission. For example, the base station may reduce/reset the CW size to a minimum value, which may be configured at the base station, predetermined according to a configuration, determined from instructions stored in memory, etc., and/or the like.

CW Update Based on LBT Initiation or Ongoing LBT

Referring again to FIG. 5B, although ACK/NACK feedback has been received in the COT, there may be a minimum processing time that the base station uses to recover the ACK/NACK feedback. During this minimum processing time, a LBT may be initiated before the ACK/NACK feedback is available for use. The base station may further adjust CW size based on whether an LBT is initiated prior to the base station processing the feedback.

Referring to FIG. 5B, the base station may maintain the CW size until the feedback is processed when the LBT is initiated prior to the base station processing the feedback. Alternatively, referring to FIG. 5C, the base station may increase the CW size to double CW 550 when the LBT is initiated prior to the base station processing the feedback. The base station may then reset/reduce the CW size at a subsequent time 560 after processing the feedback, if feedback is positive, e.g., comprises an ACK.

Figure 6A:
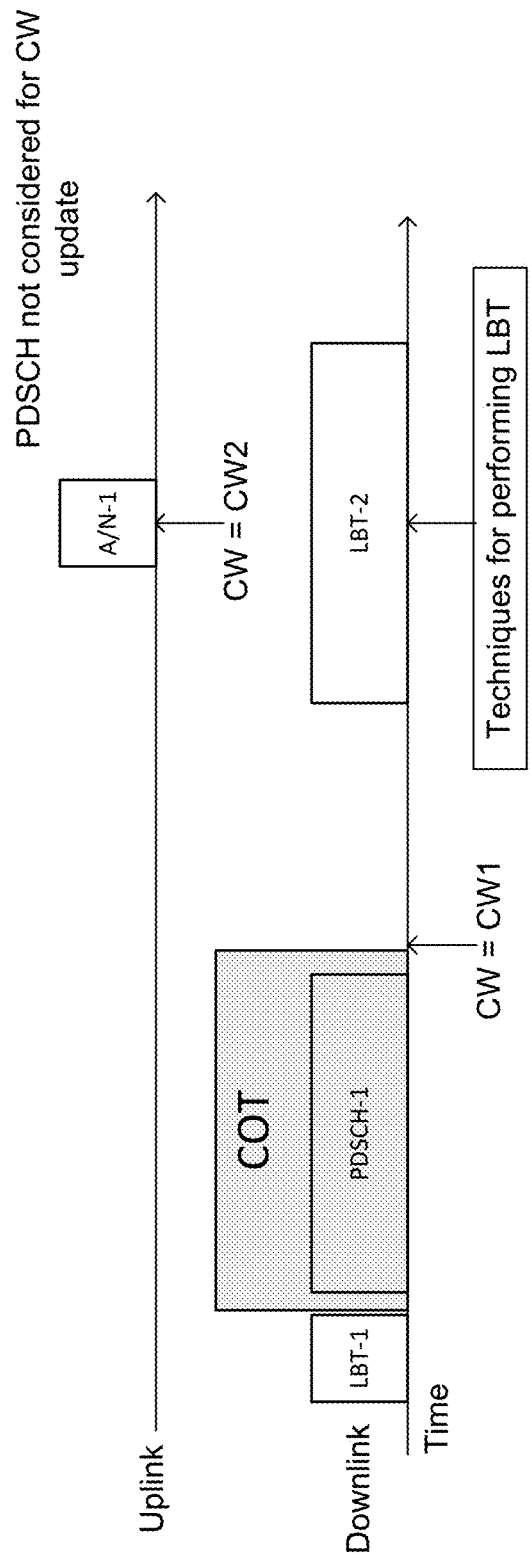
FIG. 6A illustrates a timeline of an example of an adjusted CW value that may be used by an ongoing LBT according to one example.

Referring to FIG. 6A, when the base station determines to adjust the CW size to a new CW size, the base station may determine whether to apply the new CW size to an ongoing LBT process (e.g., LBT-2). Although aspects are illustrated for a base station, aspects may also be applied by a UE in determining when to apply a new CW size for LBT. The base station may use an amount of time to make the determination about whether to adjust the CW. Once a new CW size has been determined, a new LBT process may have already started so that the new CW size is determined during an ongoing LBT process. In one example, the base station may determine to maintain a current CW size throughout the ongoing LBT process. The base station may apply the new CW size to the next LBT process that begins after the CW update is determined. In another example, the base station may determine to apply the new CW size during the ongoing LBT process, e.g., when the new CW size is smaller than a current CW size. Thus, the base station may change to a reduced CW size during an ongoing LBT process. The base station may determine whether or not to apply the change to the CW during the ongoing LBT process based on whether the CW size becomes smaller than the current CW size by a threshold amount. If the base station determines to apply the smaller CW size, the base station may reinitiate the LBT procedure. Thus, the threshold amount may be an amount that would cause the base station to benefit from restarting the LBT process.

The base station may determine to restart the LBT using the new CW size when the new CW size is greater than a current CW size. The base station may continue the ongoing LBT using the current CW size when the new CW size is less than or shorter than the current CW size. When re-starting the LBT, the base station may determine a new backoff value using the new CW size. In another example, the base station may determine to restart the LBT using the new CW size. When re-starting the LBT, the base station may determine the new backoff value based on a current LBT backoff counter, a new backoff value based on the new CW, or a prior backoff that was based on a previous CW size. For example, the base station may determine the new LBT backoff counter=minimum (current LBT backoff counter+ new random backoff—old random backoff, X). X may correspond to a fixed minimum value, such as 0, 1, etc. Thus, the base station may determine a new LBT backoff counter as a function of a current LBT backoff counter, a new random backoff based on the new CW, and/or a previous random backoff that was based on the previous CW.

Figure 6B:
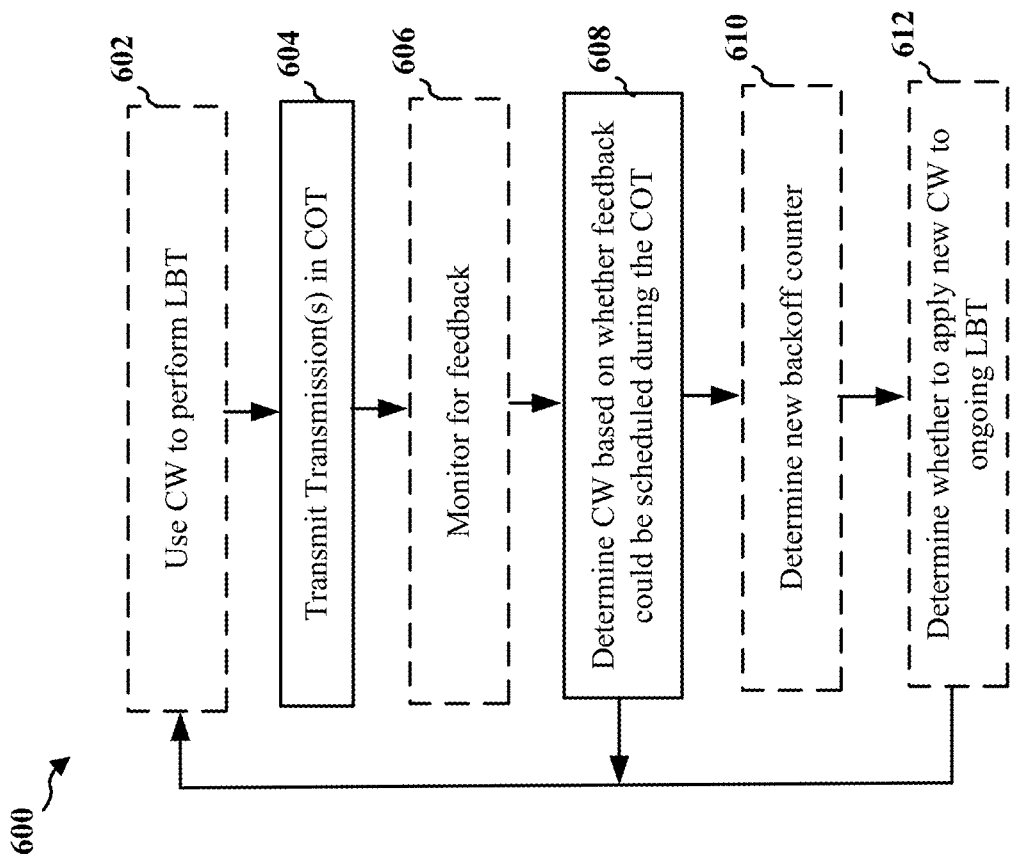
FIG. 6B is a flowchart of a method of wireless communication according to a first example.

FIG. 6B is a flowchart 600 of a method of wireless communication including maintenance of a CW sequence. The method may be performed by a base station or a component of a base station (e.g., base station 102, 180, 310, apparatus 2002, 2002'; the processing system 2114, which may include the memory 376 and which may be the entire base station 310 or a component of the base station 310, such as the TX processor 316, the RX processor 370, and/or the controller/processor 375). In another example, the method may be performed by a UE or a component of a UE (e.g., UE 104, 350, apparatus 2002, 2002'; the processing system 2114, which may include the memory 360 and which may be the entire UE 350 or a component of the UE 350, such as the TX processor 368, the RX processor 356, and/or the controller/processor 359). Optional aspects are illustrated with a dashed line. FIGS. 4-6A illustrate example aspects of a CW sequence that may be generated based on the method of flowchart 600.

At 604, the device transmits at least one transmission during a COT. The transmission(s) may comprise a data transmission or a shared channel transmission. For example, if the method is performed by a base station, the at least one transmission may comprise a PDSCH transmission. If the method is performed by a UE, the at least one transmission may comprise a PUSCH transmission. Prior to transmitting the transmission(s) during the COT, the device may perform LBT, at 602. A CW size may be used in performing LBT.

After transmitting the data transmission(s) during the COT, the device may monitor for feedback, e.g., ACK/NACK, corresponding to the data transmission(s) transmitted during the COT, as illustrated at 606. The device may use the feedback, or the absence of feedback to determine whether to update/adjust the CW size.

At 608, the device may determine a CW (e.g., a CW size) following the COT based on whether feedback for the data transmission(s) could be scheduled during the COT. For example, the device may maintain the CW size at a current value, e.g., even if no positive feedback is received, based on determining that it is not possible for the feedback for the data transmission(s) to be scheduled for reception within the COT. The device may increase the CW size based on determining that the feedback for the data transmission(s) could have been scheduled for reception during the COT and were not scheduled to be received during the COT. The device may set the CW size to a minimum value (CW_min) when a positive acknowledgement is received by the device for the data transmission(s).

The CW size may be determined further based on whether an LBT is initiated prior to the device processing the feedback. For example, the device may maintain the CW size until the feedback is processed, when the LBT is initiated prior to the device processing the feedback. The device may increase the CW size when the LBT is initiated prior to the device processing the feedback. The device may reset the CW size after processing the feedback when the feedback is positive.

After determining the CW, at 608, the device may use the determined CW to perform LBT, e.g., at 602, in order to transmit data transmission(s), e.g., at 604. When the device determines to adjust the CW size to a new CW size, the device may further determine, at 612 whether to apply the new CW size during an ongoing LBT process. For example, the device may determine to maintain a current CW size during the ongoing LBT process. The device may determine to re-start the LBT using new CW size when the new CW size is smaller than a current CW size. The device may re-start the LBT using the new CW size when the new CW size is longer than a current CW size, and wherein the device continues the ongoing LBT using the current CW size when the new CW size is not longer than the current CW size.

As illustrated at 610, the device may determine a new LBT backoff counter value using the new CW size. The determination of the new LBT backoff counter value using the new CW size may include determining the current LBT backoff counter value, a new random backoff based on the new CW, or a prior random backoff that was based on a previous CW size.

The device may further apply the new CW size when performing LBT in order to transmission communication.

CW Update Utilizing CW Sequence with Multiple Entries

Figure 7:
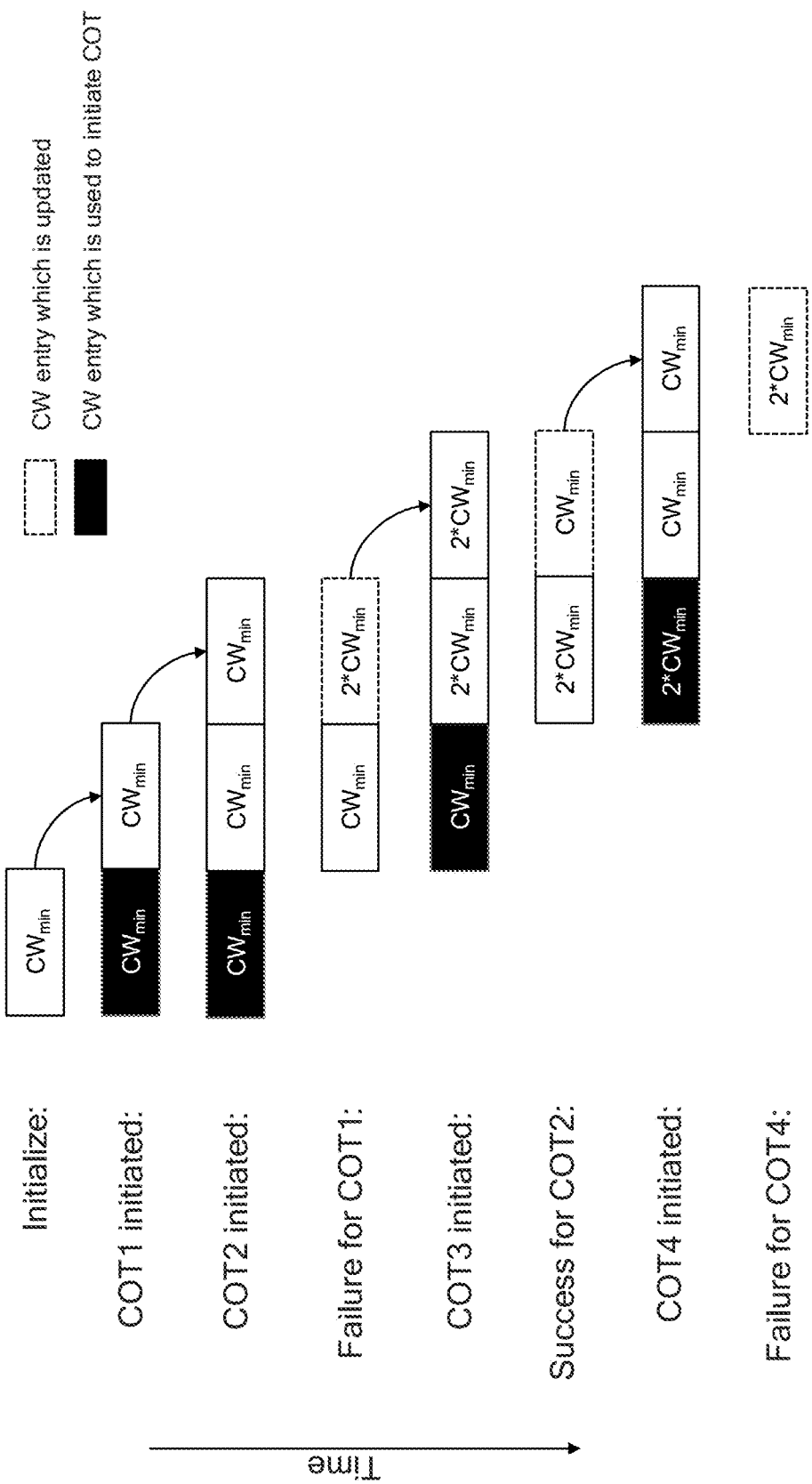
FIG. 7 illustrates a timeline of an example of a CW sequence with multiple entries each with CW values that may be used to handle multiple ACK/NACK feedback arriving at different times according to one example.
Figure 8:
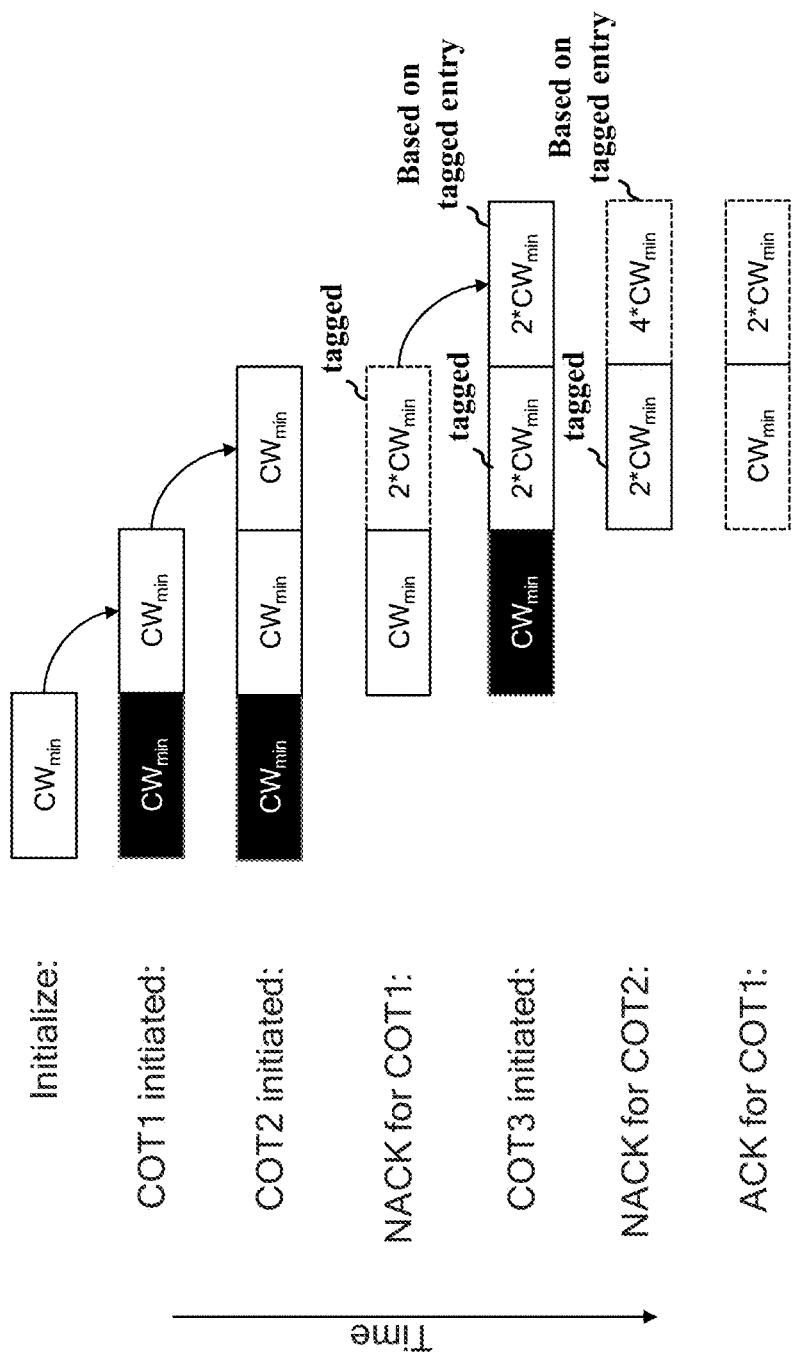
FIG. 8 illustrates a timeline of an example of a CW sequence with multiple entries each with CW values that may be used to handle multiple ACK/NACK feedback arriving at different times according to another example.

Aspects may include determining a CW update based on ACK/NACK feedback arriving at the base station at different times. Although aspects are described in connection with a base station, aspects may also be applied by a UE in determining a CW update to use for LBT (e.g., based on feedback for PUSCH transmissions) There may be multiple COTs, and each COT may comprise multiple transmissions. A base station may generate and maintain a CW sequence, each entry in the CW holding a CW value or size. FIGS. 7 and 8 illustrate examples of such CW sequences. The sequence of CWs may be used to determine a CW for a particular LBT procedure. The CW sequence may be initialized based on a minimum value, e.g., CWmin, which may correspond to a lowest possible value of a contention window.

In the example illustrated in FIG. 7, at the start of each channel occupancy, the base station may use the first entry in the CW sequence to initiate LBT. For example, COT1 may be initialized using CWmin, because CWmin is the first entry in the CW sequence. An additional entry of CW is then added to an end of the CW sequence, the added entry having the same value as the last entry of the previous CW sequence (which may also be referred to as the existing CW sequence). Thus, when COT1 is initialized in FIG. 7, an additional CWmin entry is added to the end of the CW sequence, because the last sequence of the previous CW sequence was CWmin. The example for COT3 illustrates an example where a value of 2*CWmin is added to the end of the CW sequence, because the last entry of the CW sequence prior to COT3 (e.g., when failure for COT1 is determined) was 2*CWmin.

When a COT is a success, the first entry in the CW sequence is dropped and the last entry in the CW sequence is set to CWmin. A COT may be determined to be a success when the base station confirms that at least one transmission that started at the beginning of the COT was successful, e.g., through the receipt of an ACK. In other aspects, a CW update to the CW sequence may occur after all feedback is received for a COT. When COT3 is initiated in FIG. 7, the CW sequence comprises CWmin, 2*CWmin, 2*CWmin. When COT2 is determined to be successful, the first entry (i.e., CWmin) of the CW sequence is dropped, and the last entry is set to CWmin.

When a COT is a failure, the first entry in the CW sequence is dropped, and the last entry in the CW sequence is increased. For example the last entry may be set to a minimum of a previous CW that has been doubled (e.g., 2*the previous CW) and a maximum CW (e.g., CWmax). This relationship may be expressed as min(CWprevious*2, CWmax). A channel occupancy may be considered a failure when the base station confirms that no transmission that started at a beginning of the COT was successful, e.g., either through receipt of a NACK or a lack of feedback received. For example, a maximum number of COTs may be used to determine whether feedback indicates success or failure of a COT. For example, if the maximum number of COTs is three, a COT may be considered a failure if feedback is not received after three COTs. In FIG. 7, when COT2 is initiated, the CW sequence comprises CWmin, CWmin, CWmin. When COT1 is determined to be a failure, the first entry (i.e., CWmin) of the CW sequence can be dropped, and the last entry can be set to 2*CWmin.

If feedback is received for a particular channel occupancy while waiting for feedback for a number (N) of previous channel occupancies, the first N values of the CW sequence may be dropped and the feedback of these N previous channel occupancies may not be considered for the CW sequence update. In one example, the base station may not re-initialize CW sequence during the time duration the base station has an active connection with at least one UE. The base station may re-initialize CW sequence if no UE is connected to the base station.

FIG. 9 is a flowchart 900 of a method of wireless communication including maintenance of a CW sequence. The method may be performed by a base station or a component of a base station (e.g., base station 102, 180, 310, apparatus 2002, 2002'; the processing system 2114, which may include the memory 376 and which may be the entire base station 310 or a component of the base station 310, such as the TX processor 316, the RX processor 370, and/or the controller/processor 375). In another example, the method may be performed by a UE or a component of a UE (e.g., UE 104, 350, apparatus 2002, 2002'; the processing system 2114, which may include the memory 360 and which may be the entire UE 350 or a component of the UE 350, such as the TX processor 368, the RX processor 356, and/or the controller/processor 359). Optional aspects are illustrated with a dashed line. FIG. 7 illustrates example aspects of a CW sequence that may be generated based on the method of flowchart 900.

At 902, the device may generate or maintain a variable length CW sequence with multiple entries, each entry having a CW value. The CW sequence may be initialized with an entry for a minimum CW. The device may maintain the CW sequence by selectively updating the CW sequence and value of certain entries based on initiation of COTs and success or failure of a COT, e.g., as described in connection with FIG. 7. For example, at the start of each COT, an entry may be added to the CW sequence. Upon failure or success of a COT, the device may discard the first entry in the CW sequence and selectively adjust the value of certain entries of the CW sequence.

At 904, the device may start a new COT by using a value in a first entry of CW sequence to initiate LBT, e.g., Cat-4 LBT. For example, when COT1, COT2, COT3, and COT4 are initiated in FIG. 7, the first entry of the CW sequence is used to initiate the COTs. The value of the first entry when COT1, COT2, and COT3 are initiated is CWmin. When COT4 is initiated, the first entry of the CW sequence, used to initiate COT4, has a value of 2*CWmin.

When the device initiates a new COT, the device adds a new last entry to the CW sequence, at 906. The new entry has a same value as the value of the current last entry of the current CW sequence. When COT1, COT2, and COT4 are initiated, an entry of CWmin is added to the CW sequence. When COT3 is initiated, a value of 2*CWmin is added.

At 908, the device may send one or more data transmissions during the COT. For example, if the method is performed by a base station, the at least one transmission may comprise a PDSCH transmission. If the method is performed by a UE, the at least one transmission may comprise a PUSCH transmission. For example, the device may transmit at least one data transmission during the COT. At 910, the device may receive ACK/NACK feedback for at least one of the data transmissions.

The device then updates the CW sequence based on the ACK/NACK feedback for the at least one data transmission transmitted by the device during the COT or after a time delay, which may be configured (e.g., by the device and/or by another device in a wireless network), predetermined (e.g., based on a configuration and/or instructions stored in a memory of the device), etc., as described.

For example, at 912, the device may determine whether the COT is a success. The determination may be based on the ACK/NACK feedback received at 910, where ACK can indicate that the COT is successful and NACK can indicate that the COT is not successful. The device may also determine a failure for the COT based on an absence of feedback for the data transmissions (e.g., within a certain period of time allotted for receiving feedback).

When the device determines that the COT was a success, the device may discard at least the first entry of the CW sequence, at 914, and set the value of the last entry to CWmin, at 916. In the Example in FIG. 7, the determination of success for COT2 leads the device to add a CWmin entry to the CW sequence.

When the device determines that the COT was not a success (i.e., a failure), the device may discard a first entry, at 918, and set the value of the last entry to min(CWlast*2, and Cwmax), at 920. CWlast is previous value of the last entry. For example, the failure determined for COT1 may lead the device to add an entry of 2*CWmin to the CW sequence (CWmin being the last entry of the previous CW sequence).

Thus, the device may discard the first entry of the CW sequence based on receiving feedback of a prior channel occupancy, e.g., whether the feedback indicates success or failure. FIG. 7 illustrates the first entry being removed from the sequence when failure is determined for COT1 and when success is determined for COT2.

Once the CW sequence is updated, the UE may then return to step 904 to use the first entry in the updated CW sequence to perform another LBT procedure in order to transmit additional data in another COT, e.g., at 908. Then, the process continues as feedback is received and used to update the CW sequence that is used to determine a CW for the LBT at step 904.

The device may update or adjust CW after all feedback is received for a COT. In one implementation, the device nay set a maximum number N Channel Occupancies to wait for feedback, after which the Channel Occupancy is determined to be a failure, where N may be a positive integer, e.g., 3.

If feedback is received for a particular channel occupancy while awaiting feedback for a number, N, of previous channel occupancies, the device may discard the first N values of the CW sequence, e.g., at 914, 918, and ignore the feedback of these N previous channel occupancies for the purpose of CW sequence update. In one implementation, the CW value may not be re-initialized during operation of the device. The device may apply the determined CW value in performing LBT in order to transmit communication.

Continuous CW Update Techniques Employing CW Sequence

Example techniques are provided for CW update when ACK/NACK feedback arrives at different times. As with the examples described in connection with FIGS. 6 and 9, the CW sequence may include multiple entries, where each entry holds a CW value or size. However, continuous updates to a CW sequence may be made as feedback arrives in time, e.g., rather than waiting for all feedback to be received for a COT. The base station may make updates to a CW value in the CW sequence based on initiating a COT, e.g., until the CW value is used for initiating an LBT process. At that point, the base station may ignore future feedback and stop making CW updates to the particular CW value.

The base station may maintain the values of each entry in the CW sequence until a first feedback for a COT is received, e.g., may keep the CW sequence the same until first feedback is available for the COT. When the first feedback is a NACK, the base station may double the last entry of the CW sequence and tag that position. The tagging may indicate, or otherwise imply, that the value in the entry of the CW sequence is temporary and not final (e.g., may be adjusted based on additional feedback). The base station may also remove the first entry of the CW sequence. The base station may ignore all future NACK feedback, without adjusting the tagged CW entry in the CW sequence. The base station may determine to adjust the tagged CW entry only if an ACK is received for the COT, for example.

If the base station receives, at a later point in time, an ACK for a transmission in the COT, the base station may reset the CW value in the tagged position (e.g., the tagged CW entry). The base station may also update subsequent CW entries in the CW sequence that were based on the tagged entry. After this update procedure, the base station ignores further feedback. In an example sequence of {CWtag, 2*CWtag, 8*CWtag}, if an ACK is received for the COT corresponding to the tagged entry CWtag, then the CW sequence may be updated to {CWmin, 2*CWmin, 8*CWmin}. In some implementations, when a subsequent position is CWmax, the base station may determine not to update or adjust the CW size. Once a CW value or size corresponding to a tagged CW entry in the CW sequence is used for an LBT, for example, the base station may ignore other feedback for a COT which may affect the value of the tagged CW entry. In another example, the base station may continue to consider feedback for a COT which may affect the value of the tagged CW entry until all subsequent entries (based on the tagged entry) are used. Once all of the entries in the CW sequence that are based on a tagged entry have been used for LBT or cleared from the sequence, the base station may ignore future feedback for a COT which may affect the value of the tagged CW entry.

Referring to FIG. 8, at the start of each COT, the base station may use a first entry of the CW sequence to initiate a LBT, e.g., Cat-4 LBT. For example, when COT1, COT2, and COT3 are initiated, CWmin is the first entry of the CW sequence and may be used to initiate the COTs. The base station may also add an additional entry to the CW sequence when a COT is initiated, similar to the example in FIG. 7. The additional entry may be assigned a value that is the same value as a last entry of the existing CW sequence, as described in connection with FIG. 7. Whenever feedback in the form of ACK or NACK is received for a particular COT, the base station may update the values of the last entry of the CW sequence as shown. For example, when a NACK is received for a transmission in COT1, the value of the last CW entry may be multiplied by two. The adjusted CW entry may be tagged, e.g., if additional feedback is expected for COT1. When a NACK is received for a transmission in COT2, the value of the last entry of the existing CW sequence may be doubled from 2*CWmin to 4*CWmin. The CW entry may be similarly tagged, e.g., because it is based on a CW that may be changed if an ACK is received for another transmission in COT1. When an ACK is received for a transmission in COT1, the value of a tagged position (e.g., 2*CWmin) may be reset to CWmin. The base station may also update subsequent CW entries that are based on a tagged entry once an ACK is received. For example, when the ACK is received for COT1 in FIG. 8, the tagged CW entry is adjusted from 2*CWmin, and the CW entry that was 4*CWmin based on the tagged entry is adjusted to 2*CWmin.

FIG. 10 is a flowchart 1000 of a method of wireless communication. The method may be performed by a base station or a component of a base station (e.g., base station 102, 180, 310, apparatus 2002, 2002'; the processing system 2114, which may include the memory 376 and which may be the entire base station 310 or a component of the base station 310, such as the TX processor 316, the RX processor 370, and/or the controller/processor 375). In another example, the method may be performed by a UE or a component of a UE (e.g., UE 104, 350, apparatus 2002, 2002'; the processing system 2114, which may include the memory 360 and which may be the entire UE 350 or a component of the UE 350, such as the TX processor 368, the RX processor 356, and/or the controller/processor 359). Optional aspects are illustrated with a dashed line. FIG. 8 illustrates example aspects of a CW sequence that may be generated based on the method of flowchart 1000.

At 1002, the device may maintain a variable length CW sequence with multiple entries, each entry having a CW value. For example, the device may update the CW sequence and values of certain entries based on initiation of COTs and ACK/NACK feedback of one or more reference transmissions. The reference transmissions may comprise downlink reference transmissions when the method is performed by a base station. For example, the device may update the CW sequence based on ACK/NACK feedback of a reference PDSCH transmitted within a COT as they arrive in time, e.g., as described in connection with FIG. 8. If the method is performed by a UE, the device may update the CW sequence based on ACK/NACK feedback of a reference PUSCH transmitted within a COT as they arrive in time, e.g., as described in connection with FIG. 8.

As illustrated at 1004, the device may start a COT, e.g., using a first entry of CW entries in the CW sequence to perform LBT. Then, at 1006, the device may transmit multiple transmissions in the COT (e.g., multiple PDSCH when the device corresponds to a base station or multiple PUSCH when the corresponds to a UE).

At decision block 1008, the device can determine whether an ACK has been received. When an ACK has not been received, processing may continue to decision block 1010, in which the device determines whether a NACK has been received. The device can determine whether to update the CW sequence based on ACK/NACK feedback for at least one of the multiple transmissions transmitted by the device during the COT. The device may then update a last entry to the CW sequence based on the ACK/NACK feedback for a PDSCH transmission during the COT.

For example, if an ACK has been received, processing continues to 1014, where the device may update an entry to CWmin. The device may then use the CW to perform LBT for an COT, at 1004, and the process may continue.

If an ACK has not been received, the UE may proceed to determine whether a NACK has been received, at 1010. If a NACK has been received, the device may increase (e.g., double) a value and tag an end CW entry at the end of the CW sequence to form a tagged entry, at 1012. For example, when the NACK is received for COT1, the last entry can be doubled to 2*CWmin and can be tagged. The device may return to the decision at 1008 to determine whether an ACK is received for at least one of the PDSCHs transmitted during the COT. If an ACK is received after the tagged entry is created, at step 1014, the tagged entry may be updated based on the ACK. For example, the tagged entry may be reduced, e.g., to CWmin. For example, in FIG. 8, when the ACK is received for COT1, the previously tagged entry can be reduced from 2*CWmin to CWmin. The device may update the tagged entry and subsequent entries based on the tagged entry when an ACK feedback is received for at least one PDSCH transmission in the COT, as described in connection with FIG. 8.

The tagged CW entry may be applied to perform LBT for a new COT, e.g., at 1004, if an ACK is not received before the tagged entry is moved to the beginning of the CW sequence.

The device may ignore subsequent ACK/NACK feedback for a COT, which may affect the value of the tagged entry, for updating the CW sequence when the tagged entry is used to initiate a new COT. In other aspects, the device may continue to update the CW sequence based on subsequent ACK/NACK feedback for a COT, which may affect the value of the tagged entry, when at least one of the subsequent entries following the tagged entry are not yet used to initiate a new COT. The subsequent entries may comprise the entries whose CW value is determined based on the tagged entry.

Single CW for Feedback Arriving at Different Times

In certain aspects, a CW update is provided that handles ACK/NACK feedback arriving and being received by a base station or UE at different times. Although aspects are described in connection with a base station, aspects may also be applied by a UE in determining a CW update to use for LBT (e.g., based on feedback for PUSCH transmissions). There may be multiple COTs, where each COT has multiple transmissions, and the base station/UE may maintain a single CW.

Figure 11A:
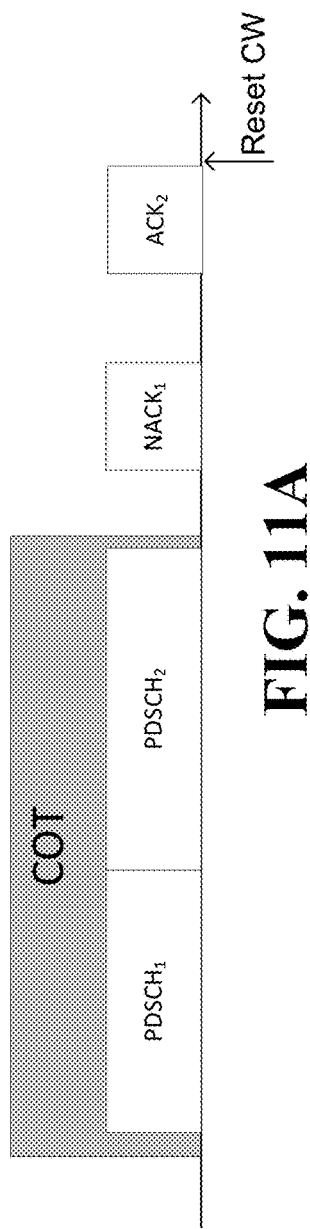
FIGS. 11A-11C illustrate options for CW update using a single CW to handle multiple ACK/NACK feedback arriving at different times according to some examples.

For example, a base station may transmit multiple downlink transmissions during a COT. The base station may determine whether to adjust a CW size based on ACK/NACK feedback for the multiple downlink transmissions transmitted by the base station during the COT. In one example, referring to FIG. 11A, the base station may maintain a current CW size until all feedback is scheduled to be received for the multiple downlink transmissions during the COT. In this case, the base station can wait until all feedback is scheduled to be received by the base station. In FIG. 11A, the CW is reset because an ACK2 was received. The base station may reduce the CW size, e.g., to a minimum value when an ACK is received for any of the multiple downlink transmissions transmitted during the COT. Thus, the base station may update the CW when the ACK is received, e.g., without waiting for other feedback for the COT, whereas the base station may maintain the CW size until a last feedback is received when NACK(s) are received for the COT.

Figure 11B:
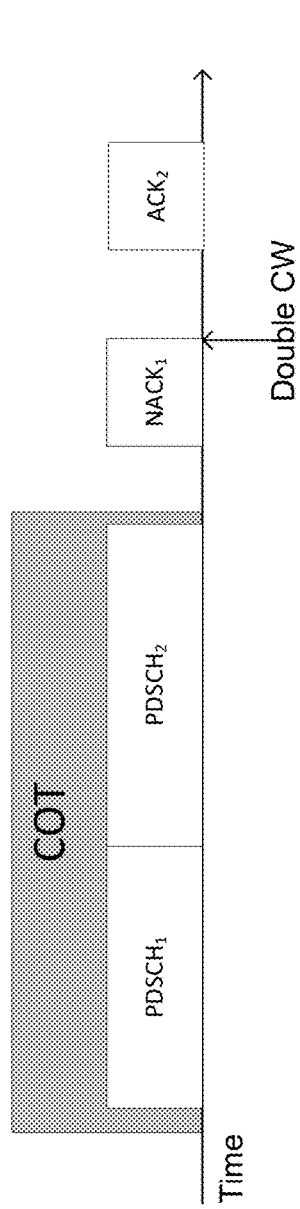

In another example, the base station may adjust the CW size based on a first available ACK/NACK feedback and may ignore subsequent ACK/NACK feedback. In FIG. 11B, the first available feedback is a NACK, and the base station doubles or otherwise increases the CW based on the NACK even though an ACK2 is subsequently received.

Figure 11C:
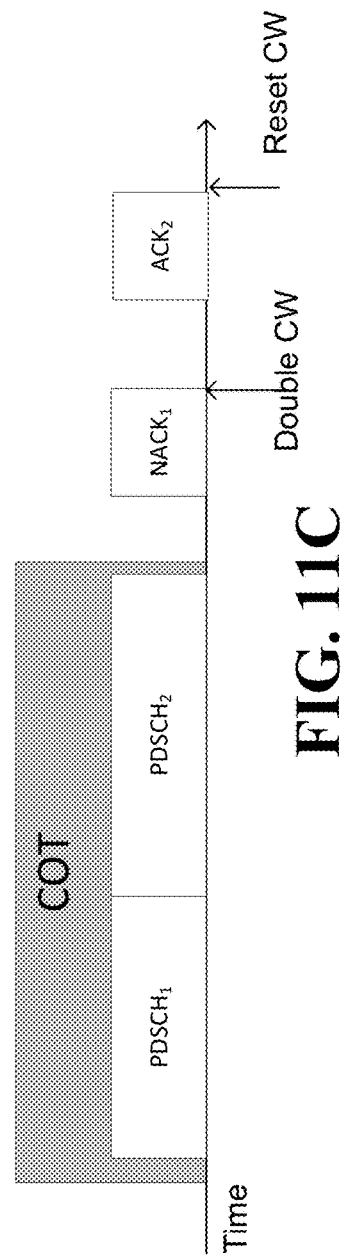

In another example, the base station may keep the CW paused. On receiving first feedback that includes NACK(s), the base station may increase (e.g., double) the CW size, as illustrated in FIG. 11C. If a subsequent ACK is received for the COT, the UE may reduce the increased CW size to a minimum value, CWmin, as illustrated in FIG. 11C.

In another example, the base station may determine a CW update time associated with a COT. While initiating an LBT process, base station may determine the COT associated with the most recent CW update time. The base station may perform CW update based on the ACK/NACK feedback of transmissions in the COT corresponding to the most recent CW update time. In one example, the distance of the CW update time from the associated COT may be upper bounded by a maximum limit. The maximum limit may be measured from different points, such as, a start of the COT or the end of the COT and may be in units of time.

Figure 11D:
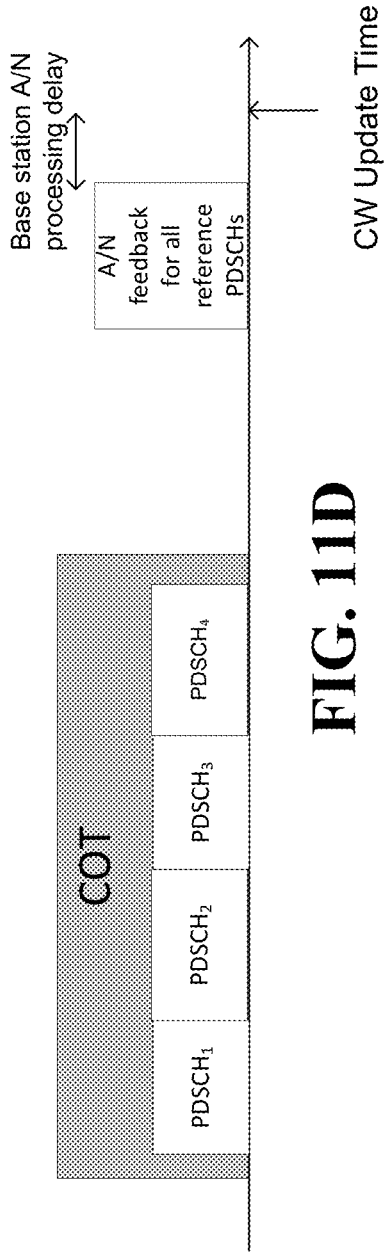
FIGS. 11D-11E illustrate options for CW update using CW update time according to some examples.
Figure 11E:
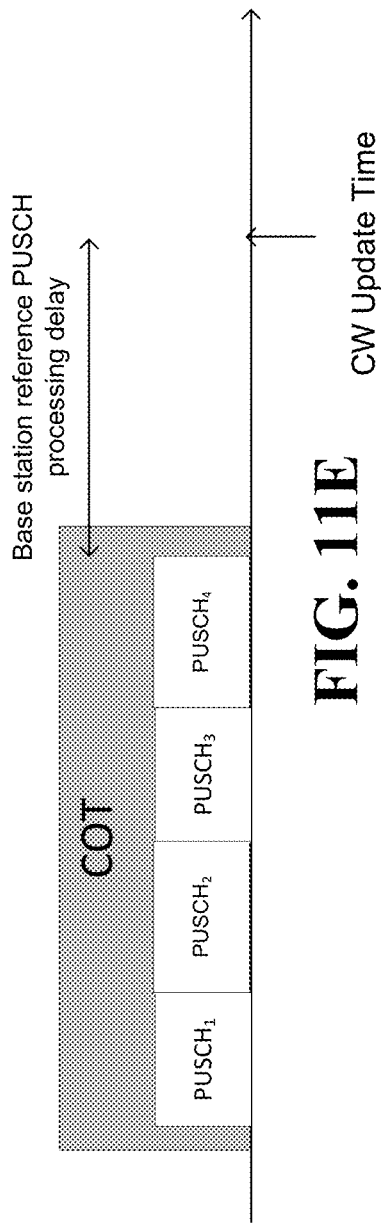

The base station may determine CW update time for a COT based at least on part on scheduling decision of the base station. For example, the base station may determine CW update time for a COT based on where a base station schedules ACK/NACK feedback for different PDSCHs transmitted within the COT. Referring to FIG. 11D, the base station may include in the CW update time delays associated with processing the ACK/NACK feedback, such as delay associated with decoding the feedback for PDSCH or decoding PUSCH by the base station. Referring to FIG. 11E, for a COT consisting of only PUSCH transmissions, the CW update time can be end of last PUSCH in addition to base station PUSCH decoding processing time.

When a plurality of ACK/NACK feedback is received for different COTs at the same time, the base station may process the plurality of feedback based on an order of the different COTs associated with the plurality of feedback. Consider an example where there are two COTs, COT1 and COT2 where COT2 occurs later in time than COT1. When ACK/NACK feedback from COT1 and COT2 arrives at the same time, the base station may first use the ACK/NACK feedback of COT1 to update CW and then use the ACK/NACK feedback of COT2 to update or adjust CW. In another example, the base station may use the ACK/NACK feedback for a latest COT to selectively adjust the CW size and discard and/or otherwise not consider other ACK/NACK from other COTs in CW update.

When a plurality of ACK/NACK feedback is received for different COTs in a same COT, the base station may process the plurality of ACK/NACK feedback in an order of arrival of each of the plurality of feedback. Alternatively, the base station may store the ACK/NACK feedback, and at the end of COT, process the ACK/NACK as if the feedback were received at the same time.

When a plurality of ACK/NACK feedback is received for different COTs, the base station may process the plurality of feedback using a maximum delay time to determine which of the plurality feedback to consider. This maximum delay time can include a timeout after which arriving ACK/NACK may no longer be considered for CW update. The maximum delay time may be measured from different points, such as, a start of the COT or the end of the COT. The maximum delay time may be in units of slots, units of COTs, units of time or other units. In one example, when units of COTs is used as the maximum delay time, the units selected may be two COTs. After waiting for two COTs, any ACK/NACK feedback received is not considered for CW update.

Figure 12:
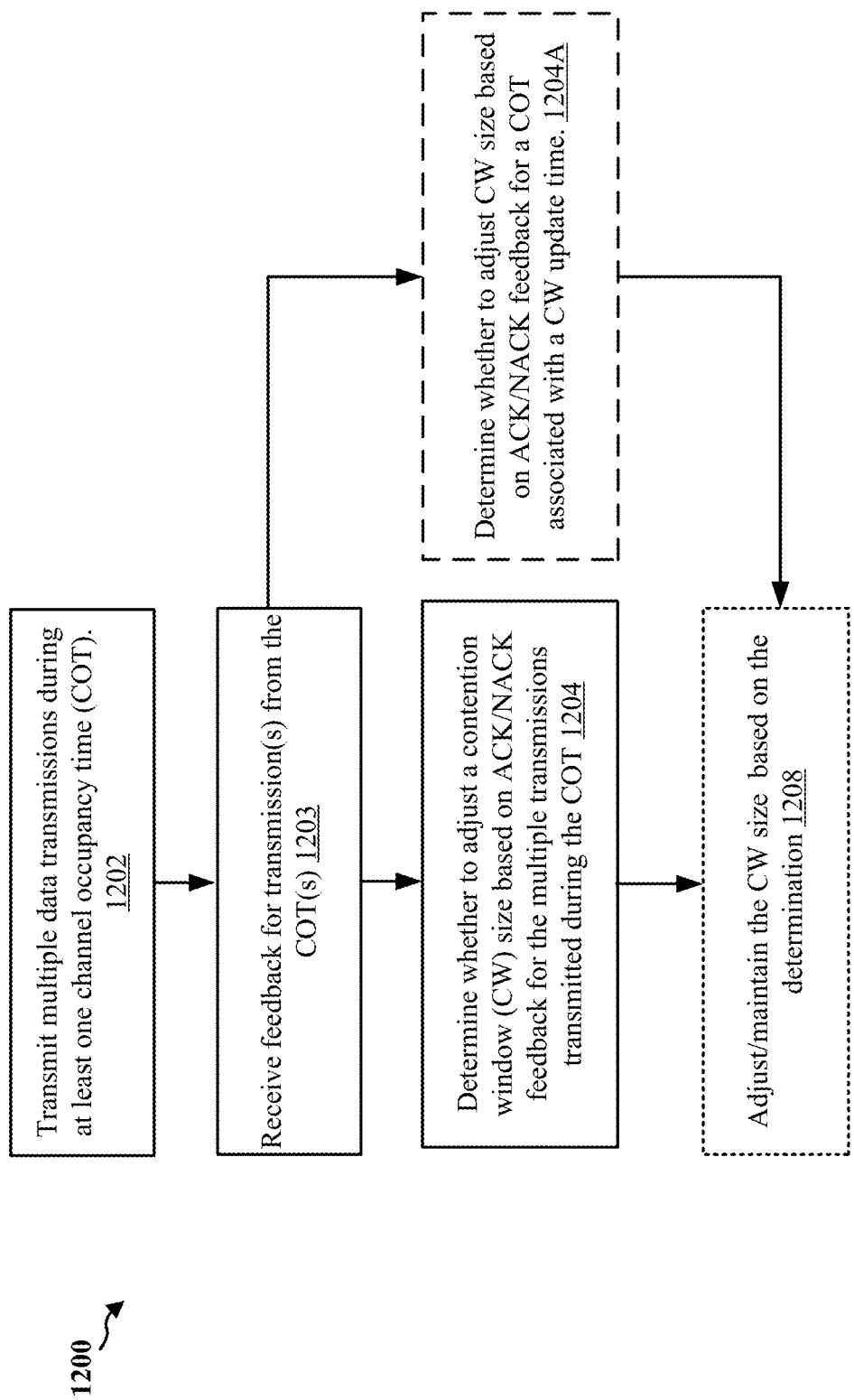
FIG. 12 is a flowchart of a method of wireless communication according to a third example.

FIG. 12 is a flowchart 1200 of a method of wireless communication. The method may be performed by a base station or a component of a base station (e.g., base station 102, 180, 310, apparatus 2002, 2002'; the processing system 2114, which may include the memory 376 and which may be the entire base station 310 or a component of the base station 310, such as the TX processor 316, the RX processor 370, and/or the controller/processor 375). In another example, the method may be performed by a UE or a component of a UE (e.g., UE 104, 350, apparatus 2002, 2002'; the processing system 2114, which may include the memory 360 and which may be the entire UE 350 or a component of the UE 350, such as the TX processor 368, the RX processor 356, and/or the controller/processor 359). Optional aspects are illustrated with a dashed line.

Referring to FIG. 12, at 1202, the device transmits multiple data transmissions during at least one COT (e.g., PDSCH if the method is performed by a base station or PUSCH if the method is performed by a UE). The transmission may be performed, e.g., by transmission component 2010 of apparatus 2002. The downlink transmissions may comprise PDSCH/PUSCH, for example.

At 1203, the device receives feedback for at least one of the transmissions that were transmitted during the COT. The feedback for different transmissions within the COT may be received at different times. As well, the device may receive feedback for different COTs at a same time or in different orders than the COTs themselves.

At 1204, a device determines whether to adjust a CW based on ACK/NACK feedback for at least one of the multiple data transmissions transmitted by the device during the COT. The determination may be performed, e.g., by Multi-feedback based CW Update component 2040 of apparatus 2002. Alternatively, the device may determine whether to adjust CW size based on ACK/NACK feedback for a COT associated with a CW update time. The determination may be performed, e.g., by Multi-feedback based CW Update component 2040 of apparatus 2002. For example, the device may determine a CW update time and use the feedback for a COT associated with the CW update time to determine whether to adjust the CW size. In one instance, the device may determine a most recent CW update time and use the feedback for a COT associated with the most recent CW update time to determine whether to adjust the CW size. The device may determine the CW update time based on scheduling decisions of the device and processing delays or decoding delays. The device may determine the CW update time or the most recent CW update time when initiating a LBT process.

The determination may be based on a first available feedback, for example. The determination, at 1204, and/or the adjustment at 1208 may include aspects described in connection with the method of FIG. 10, e.g., any of 1004-1014.

At 1206, the device adjusts or maintains the CW size based on the determination at 1204 or at 1204A. For example, the device may adjust the CW size to a minimum value when an ACK is received for any of the multiple data transmissions transmitted during the COT and may maintain the CW size until a last feedback is received when at least one NACK is received, e.g., as described in connection with FIG. 11B. The device may maintain a current CW size until all feedback is scheduled to be received for the multiple data transmissions during a COT, e.g., as described in connection with FIG. 11A. The device may adjust the CW size based on a first available feedback. The device may increase the CW size to an increased (e.g., doubled) CW size based on receiving a first feedback that is a NACK, and if an ACK is received, may reduce the increased CW size to a minimum, e.g., as described. When a plurality of feedback is received for different COTs, the device can process the plurality of feedback based on an order of the different COTs associated with the plurality of feedback. The device may use the feedback for a latest COT to determine whether to adjust the CW size. When a plurality of feedback is received during a COT for different COTs, the device processes the plurality of feedback in an order of arrival of each of the plurality of feedback. The device may process the plurality of feedback at the end of the COT. When a plurality of feedback is received for different COTs, the device may process the plurality of feedback using a maximum delay time to determine which of the plurality feedback to consider. The determination/adjustment may be performed, e.g., by Multi-feedback based CW Update component 2040 of apparatus 2002.

UE-Side CW Adjustment/Update

When a UE transmits multiple back to back uplink transmissions (e.g., PUSCH transmissions) in a COT, the ACK/NACK feedback for the PUSCHs may be received by the UE at very different times and in a different order than the transmission order. As an example, in NR based communication, timelines may be variable so that feedback for the uplink transmissions may be transmitted by a base station, and received by the UE, at different times and in a different order than the PUSCH on which the feedback is based. Aspects are presented herein that enable a UE to adjust/update CW size based on feedback that may be delayed relative to the PUSCH and/or may have a variable timing.

Figure 13A:
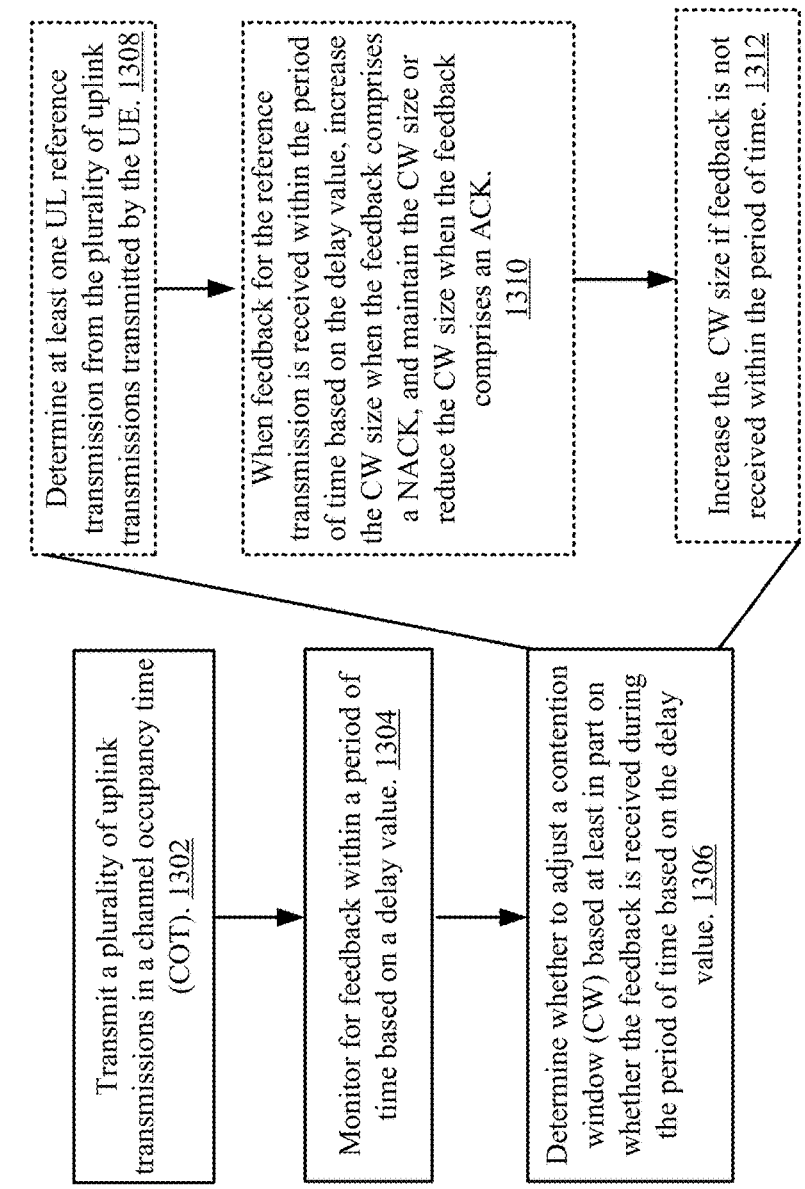
FIG. 13A is a flowchart of a method of wireless communication according to a fourth example.
Figure 13B:
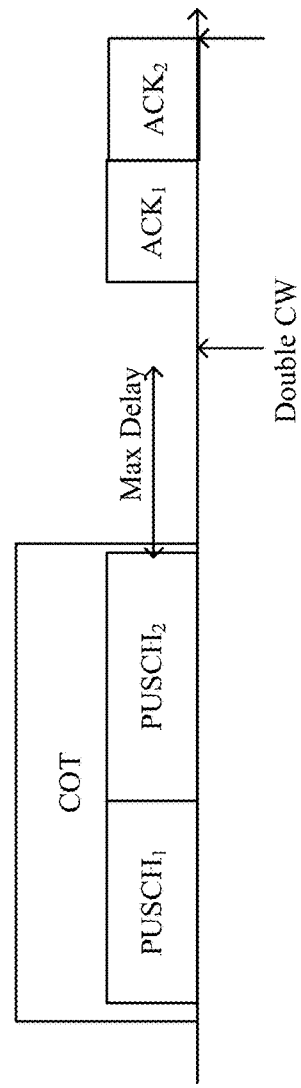
FIG. 13B illustrates a timeline of an example of updating a CW according to aspects described herein, such as the fourth example.

The aspects described in connection with FIGS. 4-12 that are described for a base station to make determinations about CWs may also be employed by a UE. Whereas a base station may know when the ACK/NACK feedback is expected in response to a downlink transmission, a UE may not be aware of when ACK/NACK feedback is expected from a base station in response to an uplink transmission. To address this, in one example, the UE may enhance the above-noted techniques by utilizing a maximum delay time to determine how long to wait for feedback. The network may configure a maximum delay for the UE to apply in making determinations about CW updates. The maximum delay value may be fixed or predetermined, or may be based on a predetermined information. The maximum delay value may be RRC configured for the UE, configured for the UE through DCI, or provided to the UE in some other mechanism. The UE may wait for feedback on a reference transmission (e.g., a reference PUSCH) to be received within a period of time based on the maximum delay. If the UE receives feedback within the maximum delay, the UE may adjust the CW based on the feedback. For example, the UE may either double the CW size or reset the CW size to CW_min based on whether the feedback is a NACK or ACK, respectively. When the maximum delay elapses, if the UE has not received any feedback, the UE can double or otherwise increase the CW size, as illustrated in FIG. 13B. Thus, the UE may adjust the CW size as if a NACK had been received when no feedback is received within a period of time based on the maximum delay.

In certain aspects, the UE may reset the CW size after a maximum delay has elapsed when the UE subsequently receives ACK feedback. FIG. 13B illustrates the UE receiving ACK1 for PUSCH1 and ACK2 for PUSCH2 after the maximum delay. The UE may reset/reduce the CW size (from the increase CW size that was applied following the maximum delay) to a minimum CW size when the ACK(s) are received. In another alternative, the UE may change from a first reference PUSCH to a second reference PUSCH based on which feedback is received earliest. The UE may make the change to the other reference PUSCH, e.g., when the second reference PUSCH also starts within an initial portion of the COT.

FIG. 13 is a flowchart 1300 of a method of wireless communication. The method may be performed by a UE or a component of a UE (e.g., UE 104, 350, apparatus 1802, 1802'; the processing system 1914, which may include the memory 360 and which may be the entire UE 350 or a component of the UE 350, such as the TX processor 368, the RX processor 356, and/or the controller/processor 359). Optional aspects are illustrated with a dashed line.

At 1302, the UE transmits a plurality of UL transmissions in a channel COT. The transmission may be performed, e.g., by transmission component 1810 of apparatus 1802.

At 1304, the UE monitor for feedback within a period of time based on a delay value. The delay value may include a preconfigured or otherwise determined delay value, e.g., a fixed delay value, which may be fixed in a memory of the UE based on a radio access technology. The delay value may be indicated to the UE by a base station. The delay value may comprise a configured delay value that is configured through RRC, DCI, etc. The monitoring for feedback until a timeout expires may be performed, e.g., by Multi-FB based CW Update Component 1830 of apparatus 1802. The monitoring for feedback until a timeout expires may be performed, e.g., by Multi-FB based CW Update Component 1830 of apparatus 1802.

At 1306, the UE determines whether to adjust CW based at least in part on whether the feedback is received during the period of time based on the delay value. The determination to adjust CW may be performed, e.g., by Multi-FB based CW Update Component 1830 of apparatus 1802. The determination at 1306 may include aspects described in connection with 1308, 1310 and 1312. At 1308, the UE may determine at least one UL reference transmission from the plurality of uplink transmissions transmitted by the UE to use for CW update. The reference transmission may be a PUSCH whose feedback is received earliest. At 1310, when feedback for the reference transmission is received within the period of time based on the delay value, the UE may increase the CW size when the feedback comprises a NACK, and/or may maintain the CW size or reduce the CW size when the feedback comprises an ACK. At 1312, the UE may increase the CW size if feedback is not received within the period of time. Subsequently, the base station may reduce the CW size when an ACK is received for the reference transmission.

CBG-TI Based CW Adjustment

A UE may adjust a CW based in part on changes in a New Data Indicator (NDI) (e.g., when NDI is toggled or flipped) transmitted to the UE (e.g., from a base station), which can indicate to the UE that the base station is requesting a new TB. In NR, for example, each TB may be divided into multiple code block groups (CBGs). The base station may include Code Block Group Transmission Information (CBG-TI) in an uplink grant that is sent to the UE. The CBG-TI indicates to the UE which CBGs to retransmit to the base station.

In one example, the UE may adjust or update a CW size based at least in part on CBG-TI. The UE may double the CW size when the CBG-TI requests retransmission of all CBGs that the UE transmitted previously. The UE may reset the CW size when a current CBG-TI value has a change from a previous CBG-TI indicating that one or more additional CBGs have been successfully received/decoded by the base station. The UE may adjust the CW in this manner, e.g., even when an NDI value is not changed or toggled, indicating the use of a same TB. The base station may attempt to ensure that at least for the reference PUSCH CBG(s), the base station does not send to the UE what appears like an ACK unless the base station is providing an actual ACK. For example, for a TB having 4 CBGs that all failed in first transmission, the base station may determine to request retransmission of CBG-1 and CBG-3 in a second transmission and may determine to request retransmission of CBG-2 and CBG-4 and in third transmission. However, the first request for retransmission of CBG-1 and CBG-3, without requesting retransmission of CBG-2 and CBG-4 in the same request, may imply that CBG-2 and CBG-4 were successfully received, which may mislead the UE to incorrectly interpret that some CBGs were acknowledged by the base station, when in fact none of the CBGs were successfully received and decoded by the base station.

Also, although the base station may send CBG-TI values for all CBGs, the UE may adjust the CW size by considering ACKs for the CBG TI values corresponding to the reference PUSCH transmission since the reference PUSCH transmission may use only a subset of all the CBGs transmitted.

Although this technique is described with reference to UE-side CW size adjustment, these techniques may be applied to base station side CW size adjustment. The base station may adjust or update CW size using a technique that is based at least in part on CBG-TI. When the base station updating its CW size based on CBG ACK/NACK, the base station may consider CBG based ACK/NACK for the CBGs that the base station transmitted in the reference PDSCH(s).

FIG. 14 is a flowchart 1400 of a method of wireless communication. The method may be performed by a UE or a component of a UE (e.g., UE 104, 350, apparatus 1802, 1802'; the processing system 1914, which may include the memory 360 and which may be the entire UE 350 or a component of the UE 350, such as the TX processor 368, the RX processor 356, and/or the controller/processor 359). Optional aspects are illustrated with a dashed line.

In 1402, the UE receives a grant that includes CBG-TI having a value indicating which CBGs of a TB to be retransmitted by the UE. The reception may be performed, e.g., by reception component 1804 of apparatus 1802.

In 1404, the UE determines whether to adjust a CW size based on the CBG-TI received by the UE. The determination may be performed, e.g., by CBG-TI based CW Update component 1838 of apparatus 1802. As illustrated at 1408, the UE may adjust the CW by resetting the CW size to a minimum CW size based on determining that the CBG-TI value for a CBG is changed from a previous CBG-TI value for the CBG. As illustrated at 1410, the UE may increase the CW size based on determining that the CBG-TI requests retransmission of all CBGs that the UE transmitted previously. As illustrated at 1412, the UE may reset the CW size based on determining that a TB size changes. At 1412, in certain aspects, the UE may increase the CW size based on determining that a TB size changes. The CW adjustments or updates may be performed, e.g., by CBG-TI based CW Update component 1838 of apparatus 1802.

TB-Based CW Adjustment

There are instances where a NDI may not be changed or toggled, yet a TB size may change. The change in the TB size may cause the UE to transmit a new TB. According to one example, the UE may reset the CW size when the UE transmits a new TB. In this example, sending a new TB may be interpreted by the UE as a previous TB that is received successfully by the base station. According to another example, the UE may double or otherwise increase the CW size when the UE transmits a new TB. In this example, sending a new TB may be interpreted by the UE as a previous TB that is not received by base station.

DFI-Based CW Adjustment

Downlink Feedback Information (DFI) may be transmitted by base station for Configured Grants (CG), e.g., in NR-U. The UE may adjust or update CW size based at least in part on DFI received from the base station. In the case of Single Uplink (SUL) grants, the DFI may not include feedback for SUL grants, which may cause the UE to wait for retransmission grants, and the associated timeline can be variable. According to one technique, the DFI may include the ACK/NACK information for only that CBG of SUL HARQ IDs, which are used for CW update. For example, the DFI may include the ACK/NACK information for a first transmitted CBG within a COT, a first non-punctured transmitted CBG within a COT, or a first non-punctured CBG per sub-band. In an implementation, one bit ACK/NACK information within DFI for an HARQ process may be based on the last set of CBG transmissions requested by the base station or transmitted by the UE for the given HARQ process. For example, if the base station requests for first three CBGs transmission from the UE, and base station decodes the first CBG transmission by UE and fails to decode the latter two CBGs, the base station may send an ACK in the subsequent DFI for the given HARQ process. If the base station requests CBG transmissions corresponding to the two failed CBGs, the subsequent DFI transmitted by the base station may contain NACK for the given HARQ process, if the given two CBGs are not successfully decoded by the base station. In another implementation, the base station may not include ACK/NACK feedback for SUL grants in the DFI, e.g., if the base station includes ACK/NACK information for configured grant HARQ IDs in the DFI.

For CG HARQ IDs where ACK/NACK information is useful for both retransmission and CW update, the base station may include, within DFI, ACK/NACK feedback for transport blocks and may additionally include ACK/NACK feedback for a subset of CBGs which may be used by UE for CW update, when CBG level feedback is not enabled (e.g., TB level ACK/NACK and CBG level ACK/NACK for CW update). UE may adjust or update the CW size based at least in part on ACK/NACK feedback for the CBGs included within DFI. One advantage of this technique is that including information for only CBGs which belong to a reference duration may not significantly increase DFI overhead. In one aspect, ACK/NACK feedback for CBGs within DFI may be determined by the base station based on the CBGs that the base station has decoded corresponding to the last transmission of a CG HARQ process. Alternatively, ACK/NACK feedback for CBGs within DFI may exclude CBGs decoded by the base station corresponding to a previous transmission of a CG HARQ process. For example, if the UE transmitted a HARQ process two times with each transmission comprising three CBGs, and the base station successfully decoded one CBG at the first transmission but fails to decode any of the remaining CBGs in the second transmission, the ACK/NACK feedback within DFI after the second transmission may be NACK because the base station did not decode any CBG in the second transmission. As the base station may fail to detect some PUSCH transmissions from the UE, after successfully decoding a CBG transmission, the base station may send ACK feedback for the given CBG only for a threshold duration of time. The threshold period of time may be based on retransmission time of a HARQ process on the CG resource. After that threshold duration of time, if the base station does not detect a new CBG transmission for the HARQ process, the base station may send NACK feedback for the HARQ process. In another implementation, the UE may determine not to consider a CBG for CW update determination, if UE receives an ACK for the same CBG more than once from the base station.

FIG. 15 is a flowchart 1500 of a method of wireless communication. The method may be performed by a UE or a component of a UE (e.g., UE 104, 350, apparatus 1802, 1802'; the processing system 1914, which may include the memory 360 and which may be the entire UE 350 or a component of the UE 350, such as the TX processor 368, the RX processor 356, and/or the controller/processor 359).

At 1502, the UE receives DFI that includes feedback information about a reference transmission used for CW update value indicating which CBGs of a TB to be retransmitted by the UE. The reception may be performed, e.g., by reception component 1804 of apparatus 1802.

At 1504, the UE adjusts a CW size based on the received DFI. The DFI may include feedback for a CBG of a SUL HARQ ID used for the CW update. The DFI may include first feedback information for retransmission and second feedback information for the CW update. The first feedback may comprise TB level feedback, and the second feedback may comprise CBG level feedback. The CW update or adjustment may be performed, e.g., by DFI based CW Update component 1842 of apparatus 1802.

CW Parameters in UL Grant

In some aspects, a base station may send DCI to the UE to indicate ACK/NACK status of a reference duration so the UE can update or adjust its CW without waiting for uplink grants for corresponding HARQ processes. The base station may include CW related information in an UL grant. The CW related information may include one or more parameters associated with CW that indicates to the UE to adjust CW size in some manner (e.g., reset CW size, double CW size, or permit the UE to decide how to adjust CW size). The CW information may be based on base station's reception of a previous PUSCH sent by the UE. For example, when the base station receives a PUSCH transmitted in a reference duration, the base station may send CW related information to the UE to direct the UE to adjust its CW size (e.g., reset CW size) instead of sending separate ACK/NACK information for that HARQ ID. This technique obviates the need for base station to send a DCI to the UE only to provide ACK/NACK information on a UL reference slot. In one implementation, CW related information may be a single bit, where a value of "1" may indicate to the UE to reset CW size to CW_min, and a value of "0" may indicate to the UE that the base station permits the UE to independently determine how to adjust its CW size. In another implementation, CW related information may be a multiple bits (e.g., 2 bits). When the CW related information includes 2 bits, one of more than two possibilities may be specified. The possibilities may include reset CW size, double CW size, permit a UE to determine CW size independently, or another option. The CW related information may be jointly coded with a LBT type indication.

FIG. 16A is a flowchart 1600 of a method of wireless communication. The method may be performed by a UE or a component of a UE (e.g., UE 104, 350, apparatus 1802, 1802'; the processing system 1914, which may include the memory 360 and which may be the entire UE 350 or a component of the UE 350, such as the TX processor 368, the RX processor 356, and/or the controller/processor 359). Optional aspects are illustrated with a dashed line.

At 1602, the UE receives an UL grant including an indication about whether the UE should reset a CW size based on reception by a base station of a previous PUSCH. The indication may be coded jointly with an LBT type indication. The reception may be performed, e.g., by reception component 1804 of apparatus 1802.

At 1604, the UE determines whether to adjust a CW size based at least in part on the indication in the UL grant. The CW update or adjustment may be performed, e.g., by UL grant based CW Update component 1844 of apparatus 1802.

As illustrated at 1606, the UE may update the CW size, e.g., based on the determination at 1604. The UE may also use the CW size, whether or not adjusted, to perform a subsequent LBT in order to transmit communication.

FIG. 16B is a flowchart 1650 of a method of wireless communication. The method may be performed by a base station or a component of a base station (e.g., base station 102, 180, 310, apparatus 2002, 2002'; the processing system 2114, which may include the memory 376 and which may be the entire base station 310 or a component of the base station 310, such as the TX processor 316, the RX processor 370, and/or the controller/processor 375).

Referring to FIG. 16B, in 1652, a base station determines whether an UL transmission is received correctly from a UE. The determination may be performed, e.g., by reception component 2042 of apparatus 2002. The uplink transmission may comprise PUSCH.

In 1654, a base station transmits, to the UE, an uplink grant including an indication about whether the UE should reset its CW size based on whether the base station received the UL transmission correctly. The transmission may be performed, e.g., by transmission component 2010 of apparatus 2002. This indication may be coded jointly with a LBT type indication, as illustrated at 1658. The flowchart of FIG. 16B may correspond to the aspects performed by the base station that communicates with the UE performing the method in FIG. 16A.

Uplink CW Related Information

In some cases, the time between UL grant to UL transmission can be very short. When the UE has a large CW, the UE may not be able to transmit in a first allocated resource, even if the channel is completely idle, which wastes network resources. According to one example, a technique is provided to the UE to send UL CW related information to the base station. By communicating UL CW related information, the base station may utilize this information to update or to adjust the timing of uplink grants. The UL CW related information may include current CW value, number of times the UE has been at CW_max for one or more priority classes, or other CW-related parameters. Certain priority classes may be selected based on the level of priority, the value of CW_max, or a combination thereof (e.g., low priority classes, where the range of CW sizes is larger because the value of CW_max is large, may be selected). The UL CW related information may be configured by the base station to be sent with other information, such as CSI, or through a separate explicit trigger by the base station.

FIG. 17A is a flowchart 1700 of a method of wireless communication. The method may be performed by a UE or a component of a UE (e.g., UE 104, 350, apparatus 1802, 1802'; the processing system 1914, which may include the memory 360 and which may be the entire UE 350 or a component of the UE 350, such as the TX processor 368, the RX processor 356, and/or the controller/processor 359).

Referring to FIG. 17A, in 1702, a UE transmits to a base station CW information, such as a CW value or a parameter related to CW for the UE. The transmission may be performed, e.g., by transmission component 1810 of apparatus 1802. In 1704, the UE receives an uplink grant of resources for an uplink transmission, where a time between the uplink grant and the resources for uplink transmission is based at least in part on the CW related parameter provided by the UE. The reception may be performed, e.g., by reception component 1804 of apparatus 1802. CW related information or parameter may include a number of times that the UE has used a maximum CW size for a priority class or a current CW value of the UE.

FIG. 17B is a flowchart 1750 of a method of wireless communication. The method may be performed by a base station or a component of a base station (e.g., base station 102, 180, 310, apparatus 2002, 2002'; the processing system 2114, which may include the memory 376 and which may be the entire base station 310 or a component of the base station 310, such as the TX processor 316, the RX processor 370, and/or the controller/processor 375).

Referring to FIG. 17B, in 1752, a base station receives CW information, such as a CW value or a parameter related to CW from the UE. The reception may be performed, e.g., by reception component 2004 of apparatus 2002. In 1754, a base station transmits, to the UE, an UL grant of resources for an UL transmission, where a time between the uplink grant and the resources for uplink transmission is based at least in part on the CW related parameter for the UE. The transmission may be performed, e.g., by transmission component 2010 of apparatus 2002. In 1758, the base station can configure the UE to provide the information related to the CW related parameters along with channel state information (CSI). The CW related parameter may be a current CW value, or a number of times the UE has been at a maximum CW size (CW_max) for one or more priority classes.

Figure 18:
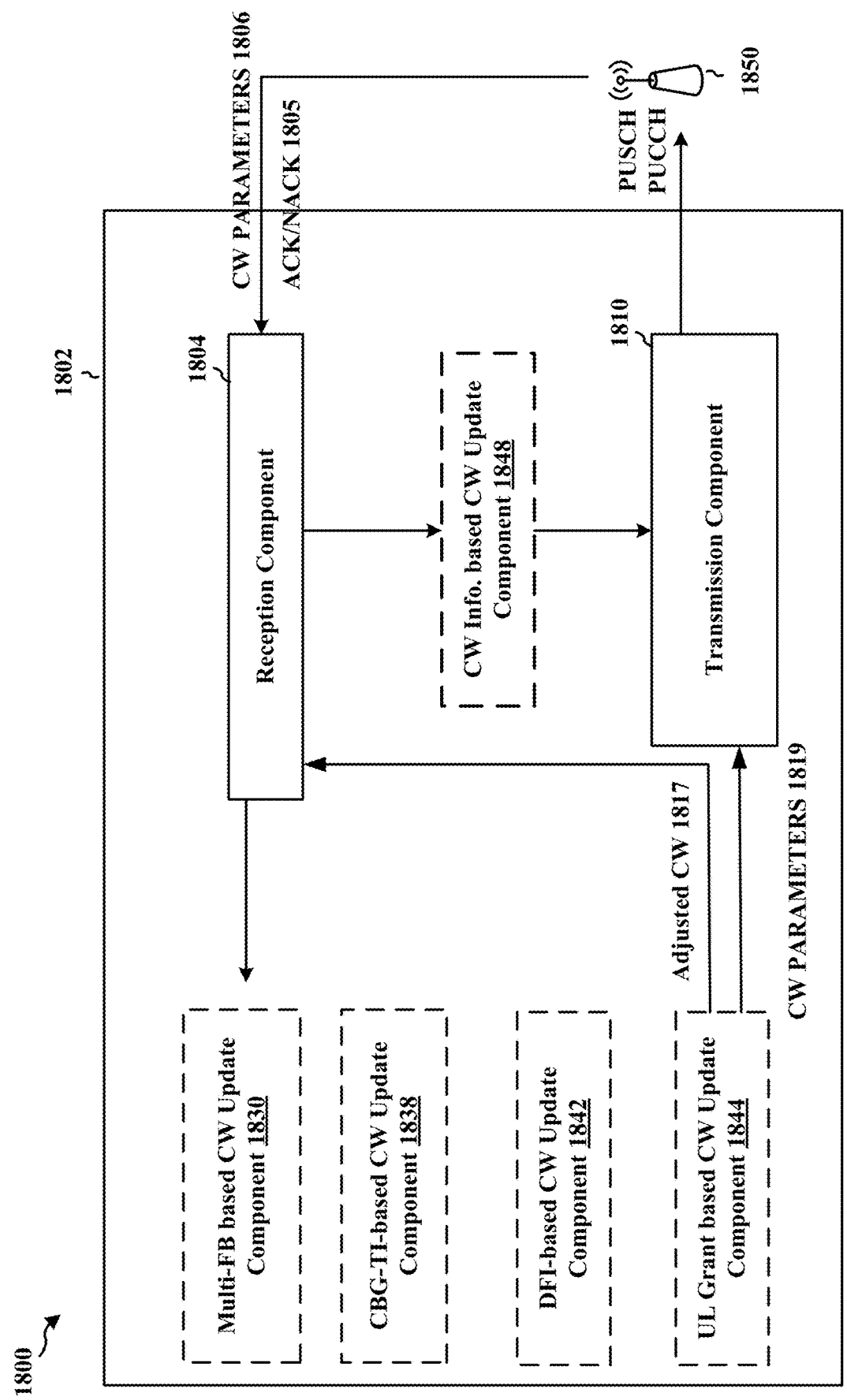
FIG. 18 is a data flow diagram illustrating the data flow between different means/components in an example apparatus.

FIG. 18 is a conceptual data flow diagram 1800 illustrating the data flow between different means/components in an example apparatus 1802. The apparatus may be a UE or a component of a UE in communication with a base station 1850. The apparatus may comprise a reception component 1804 configured to receive downlink communication from base station 1850, which may include CW parameters 1806. The apparatus may include a transmission component 1810 configured to transmit uplink communication to the base station 1850, which may include ACK/NACK feedback 1805. The apparatus may include a Multi-FB based CW Update Component 1830 configured to adjust or update the UE's CW based on ACK/NACK feedback of multiple UL transmissions and a delay value, e.g., as described in connection with 1306, 1308, 1310, and 1312 in FIG. 13A, and/or a CBG-TI-based CW Update Component 1838 configured to adjust or update the UE's CW based on CBG-TI received from base station 1850, e.g., as described in connection with 1404 and 1408 in FIG. 14. The apparatus may also include a DFI-based CW Update Component 1842 configured to adjust or update the UE's CW based on DFI received from base station 1850, e.g., as described in connection with 1504 in FIG. 15, and/or UL grant-based CW Update Component 1844 configured to adjust or update the UE's CW based on UL grant received from base station 1850, e.g., as described in connection with 1604 in FIG. 16A, which may include transmitting CW parameters 1819 via transmission component 1810 or adjusted CW parameters 1817 to the reception component 1804. The apparatus may also include a CW information-based CW Update Component 1848 configured to provide CW information to the base station to assist the base station in scheduling transmissions to the UE, e.g., as described in connection with 1704 in FIG. 17A.

The apparatus may include additional components that perform each of the blocks of the algorithm in the aforementioned flowcharts of FIGS. 12, 14, 15, 16A and 17A. As such, each block in the aforementioned flowcharts of FIGS. 12, 14, 15, 16A and 17A may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
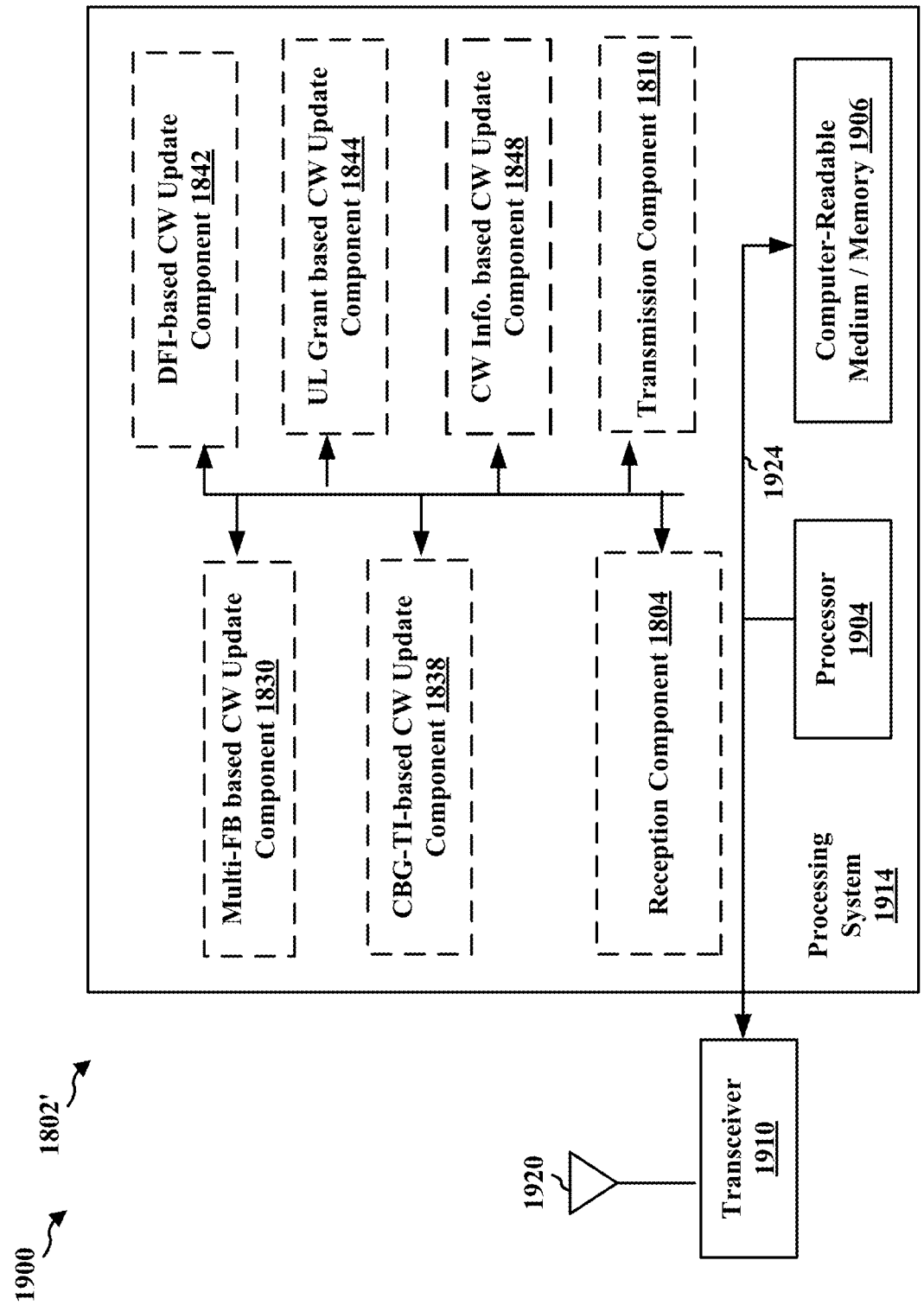
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1810, 1812, 1830, 1838, 1842, 1844, 1848, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1810, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1810, 1812, 1830, 1838, 1842, 1844, 1848. The components may be software components running in the processor 1904, resident/stored in the computer readable medium/memory 1906, one or more hardware components coupled to the processor 1904, or some combination thereof. The processing system 1914 may be a component of the base station 310 and may include the memory 376 and/or at least one of the TX processor 316, the RX processor 370, and the controller/processor 375. Alternatively, the processing system 1914 may be the entire base station (e.g., see 310 of FIG. 3).

In one configuration, the apparatus 1802/1802' for wireless communication includes means for adjusting CW based on feedback from multiple uplink transmissions, means for adjusting CW based on CBG-TI, means for adjusting CW based on DFI, means for adjusting CW based on UL grant, and means for adjusting CW based on CW information sent by the base station. The aforementioned means may be one or more of the aforementioned components of the apparatus 1802 and/or the processing system 1914 of the apparatus 1802' configured to perform the functions recited by the aforementioned means. As described supra, the processing system 1914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The UE may use the updated CW, as determined at any of 1306, 1404, 1504, and 1604, to perform LBT, e.g., in order to transmit downlink communication to a UE. The LBT may be performed, e.g., by reception component 1804 and/or transmission component 1810 of apparatus 1802. The communication between the base station and the UE may be performed on a shared spectrum or an unlicensed spectrum. For example, the communication may be based on NR-U.

Figure 20:
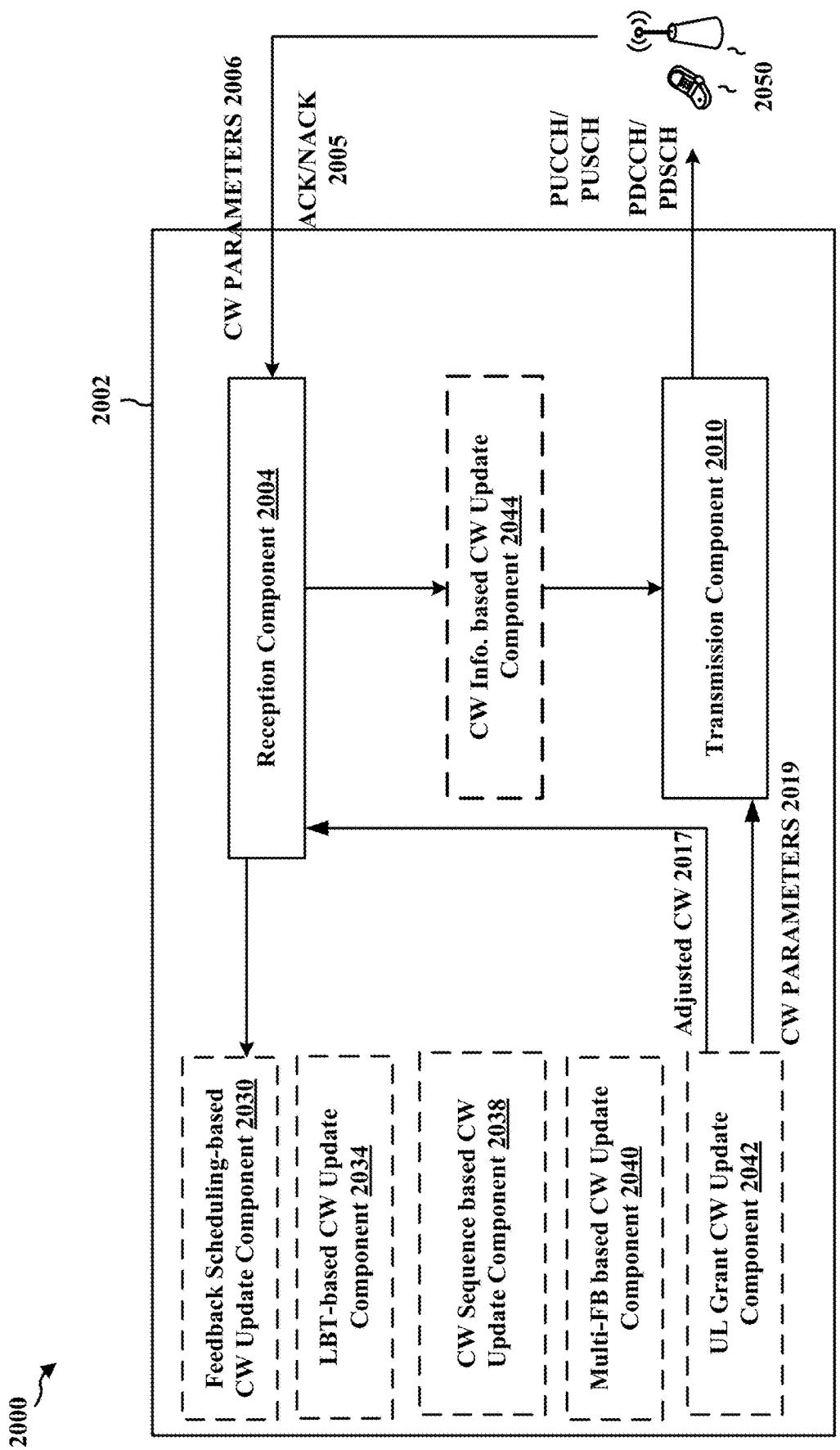
FIG. 20 is a data flow diagram illustrating the data flow between different means/components in an example apparatus.

FIG. 20 is a conceptual data flow diagram 2000 illustrating the data flow between different means/components in an example apparatus 2002. The apparatus 2002 may be a base station or a component of a base station, e.g., in communication with device 2050. In another example, the apparatus may be a UE or a component of a UE in communication with device 2050. The apparatus may include a reception component 2004 configured to receive communication from the device 2050, which may include CW parameters 2006 and/or ACK/NACK feedback 2005, and a transmission component 2010 configured to transmit communication to the device 2050. A base station may use LBT prior to transmitting to the UE, for example. A UE may use LBT prior to transmitting to the base station, for example.

The apparatus 2002 may include a Feedback Scheduling-based CW Update Component 2030 configured to determine, adjust, or update CW based on feedback scheduling by the apparatus, such as described in connection with any of 422, 424, 428; a LBT-based CW Update Component 2034 configured to determine, adjust, or update CW based on when ACK/NACK is scheduled by the apparatus and a start time of a LBT process or whether a LBT process has been initiated and is ongoing, as described in connection with FIGS. 5B, 5C, and 6; and a CW Sequence based CW Update Component 2038 configured to determine, adjust, or update CW based on a CW sequence with multiple entries as described in connection with any of 914, 918, 1014, and 1018 and further in connection with FIGS. 7-10. Component 2030 executes one of more techniques described above with reference to FIGS. 4 and 5A. Component 2034 executes one of more techniques described above with reference to FIGS. 5A, 5B, and 6. Component 2038 executes one of more techniques described above with reference to FIGS. 9 and 10.

The apparatus 2002 may further include a Multi-FB based CW Update Component 2040 configured to determine, adjust, or update CW based on feedback received by the apparatus at different times, such as described in connection with any of 1204 and 1208; a UL Grant CW Update Component 2042 configured to send an indication in an uplink grant to a UE that assists the UE to determine, adjust, or update the UE's CW based on whether the apparatus receives an uplink transmission from the UE, as described in connection with any of 1652, 1654, and 1658, which may include transmitting CW parameters 2019 via transmission component 1810 or adjusted CW parameters 2017 to the reception component 1804; and a CW Info. based CW Update Component 2044 configured to determine, adjust, or update CW based on CW-related information or parameters received from the UE as described in connection with any of 1752, 1754, and 1758 and further in connection with FIG. 17B. Component 2040 executes one of more techniques described above with reference to FIGS. 11A-11C, and 12. Component 2042 executes one of more techniques described above with reference to FIG. 16B. Components 2044 executes one of more techniques described above with reference to FIG. 17B.

The apparatus 2002 may include additional components that perform each of the blocks of the algorithm in the aforementioned flowcharts of FIGS. 9, 10, 12, 16B, and 17B. As such, each block in the aforementioned flowcharts of FIGS. 9, 10, 12, 16B, and 17B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 21:
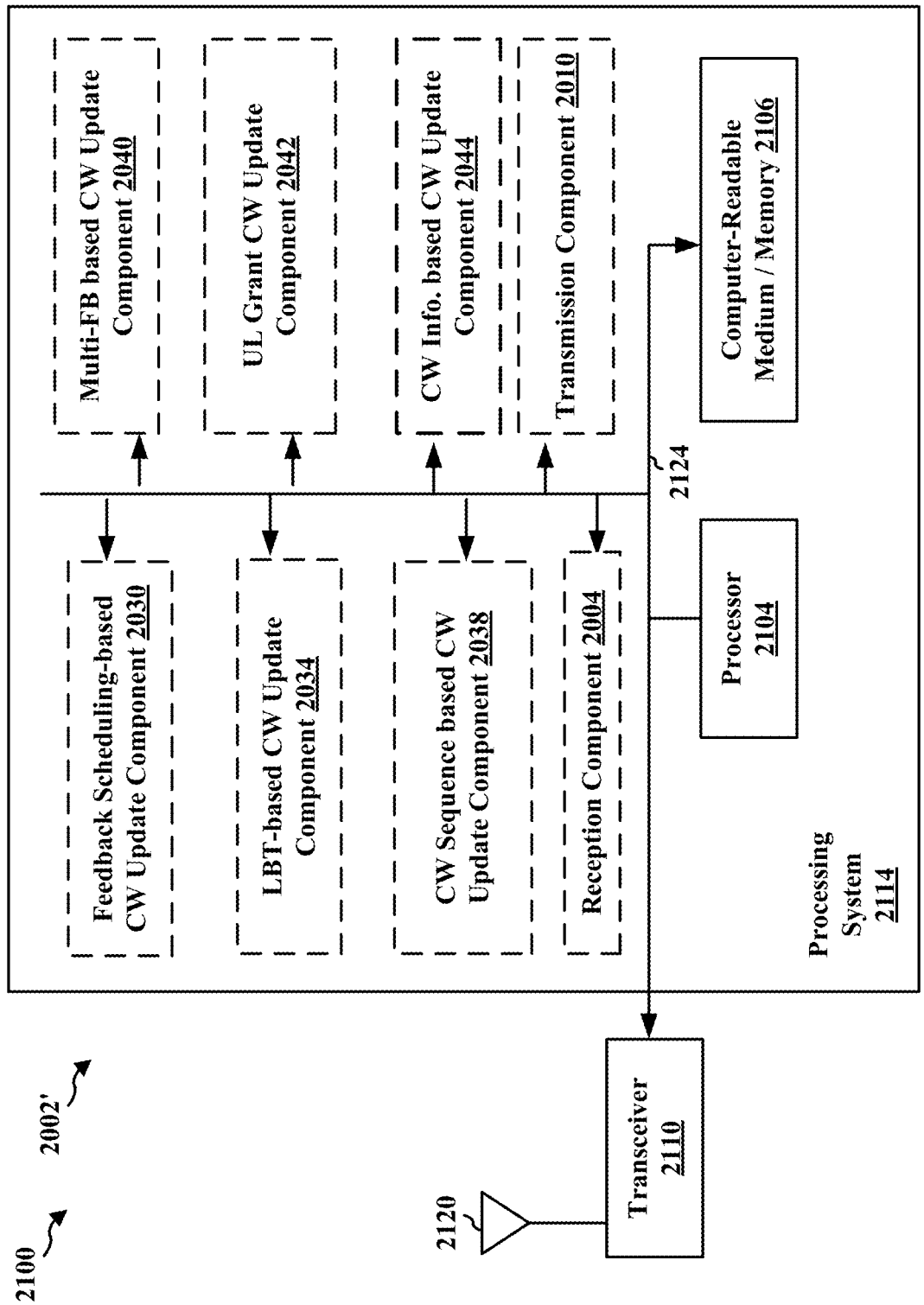
FIG. 21 is a diagram illustrating an example of a hardware implementation for an apparatus employing a processing system.

FIG. 21 is a diagram 2100 illustrating an example of a hardware implementation for an apparatus 2002' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware components, represented by the processor 2104, the components 2004, 2010, 2030, 2034, 2038, 2040, 2042, 2044 and the computer-readable medium/memory 2106. The bus 2124 may also link various other circuits such as timing sources, peripherals, voltage regulators, and power management circuits, which are well known in the art, and therefore, will not be described any further.

The processing system 2114 includes Feedback Scheduling-based CW Update Component 2030 for executing the techniques described above in connection with FIGS. 4 and 5A, a LBT-based CW Update Component 2034 for executing the techniques described above in connection with FIGS.

5A, 5B, and 6, and a CW Sequence based CW Update Component 2038 for executing the techniques described above in connection with FIGS. 9 and 10.

The processing system 2114 further includes a Multi-FB based CW Update Component 2040 for executing one of more techniques described above with reference to FIGS. 11A-11C, and 12, a UL Grant CW Update Component 2042 for executing one of more techniques described above with reference to FIG. 16B, and a CW Info. based CW Update Component 2044 for executing one of more techniques described above with reference to FIG. 17B.

The processing system 2114 may be coupled to a transceiver 1710. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114. In addition, the transceiver 2110 receives information from the processing system 2114, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106. The software, when executed by the processor 2104, causes the processing system 2114 to perform the various functions described previously for any particular apparatus. The computer-readable medium/memory 2106 may also be used for storing data that is manipulated by the processor 2104 when executing software. The processing system 2114 further includes at least one of the components 2004, 2010, 2030, 2034, 2038, 2040, 2042, 2044. The components may be software components running in the processor 1704, resident/stored in the computer readable medium/memory 2106, one or more hardware components coupled to the processor 2104, or some combination thereof.

In one configuration, the apparatus 2002' for wireless communication is a base station that includes means for adjusting or updating CW based on feedback scheduling by the base station, means for adjusting or updating CW based on when ACK/NACK is scheduled by the base station and a start time of a LBT process or whether a LBT process has been initiated and is ongoing, means for adjusting or updating CW by employing a CW Sequence with multiple entries, means for adjusting or updating CW based on multiple ACK/NACK feedback received by the base station at different times, means for sending an indication in an uplink grant to a UE that assists the UE to determine, adjust, or update the UE's CW based on whether the base station receives an uplink transmission from the UE and means for adjusting or updating CW based on CW Information based on CW-related information or parameters received from the UE.

The aforementioned means may be one or more of the aforementioned components of the apparatus 2002' and/or the processing system 2114 of the apparatus 2002' configured to perform the functions recited by the aforementioned means. As described supra, the processing system 2114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. The CW adjustment or update techniques described herein provide mechanisms to adjust CW at various times and based on a variety of factors, information, and situations. Although these techniques have been described in the context of 5G NR, these techniques may also be applicable to other multi-access technologies and the telecommunication standards that employ these technologies.

Techniques for adjusting or updating contention window for use by base station and UE for communication involve a contention window, e.g., for NR based communication such as NR-U, have been described. Although these techniques have been described in the context of NR, these techniques may also be applicable to other multi-access technologies and the telecommunication standards that employ these technologies.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In the following, an overview of further examples is provided:

1. A method of wireless communication, comprising:
    transmitting at least one data transmission during a channel occupancy time (COT); and
    determining a contention window (CW) size following the COT based on whether feedback for the at least one data transmission could be scheduled during the COT.

2. The method of example 1, wherein the CW size is maintained at a current value based on determining that it is not possible for the feedback for the at least one data transmission to be scheduled for reception within the COT.

3. The method of any of examples 1 or 2, wherein the CW size is increased based on determining that the feedback for the at least one data transmission could have been scheduled for reception during the COT and was not schedule to be received during the COT.

4. The method of example 3, further comprising: setting the CW size to a minimum value (CW_min) when a positive acknowledgement is received for the at least one data transmission.

5. The method of any of examples 1 to 4, wherein the CW size is determined further based on whether a listen before talk (LBT) is initiated prior to processing the feedback.

6. The method of example 5, wherein the CW size is maintained until the feedback is processed, when the LBT is initiated prior to processing the feedback.

7. The method of any of examples 5 or 6, wherein the CW size is increased when the LBT is initiated prior to processing the feedback.

8. The method of example 7, wherein the CW size is reset after processing the feedback when the feedback is positive.

9. The method of any of examples 1 to 8, wherein the CW size is adjusted to a new CW size, the method further comprising:
    determining whether to apply the new CW size during an ongoing listen before talk (LBT) process.

10. The method of example 9, wherein the a current CW size is maintained during the ongoing LBT process.

11. The method of any of examples 9 or 10, wherein the ongoing LBT process is restarted using the new CW size when the new CW size is smaller than a current CW size.

12. The method of any of examples 9 to 11, wherein the ongoing LBT process is restarted using the new CW size when the new CW size is longer than a current CW size, and wherein the ongoing LBT process continues using the current CW size when the new CW size is not longer than the current CW size.

13. The method of any of examples 9 to 12, wherein a new backoff counter value is determined using the new CW size.

14. The method of example 13, wherein the new backoff counter value is determined using the new CW size including determining a current backoff counter value, a new random backoff based on the new CW size, or a prior random backoff that was based on a previous CW size.

15. A method of wireless communication, comprising:
    maintaining a contention window (CW) sequence that includes multiple entries and having a variable length, each entry having a CW value;
    transmitting at least one data transmission during a channel occupancy time (COT);
    receiving feedback for the at least one data transmission;
    updating the CW sequence based on the feedback for the at least one data transmission transmitted during the COT or after a time delay; and
    using a first entry in the CW sequence to perform a listen before talk (LBT) process.

16. The method of example 15, further comprising:
    adding a new entry to the CW sequence based on initiating a new channel occupancy, the new entry having a same value of a last entry of the CW sequence.

17. The method of any of examples 15 or 16, further comprising:
    discarding the first entry of the CW sequence based on receiving feedback of a prior channel occupancy.

18. The method of example 17, further comprising:
    discarding a number, N, of initial entries of the CW sequence based on receiving a feedback for an Nth channel occupancy while awaiting feedback for N−1 previous channel occupancies.

19. A method of wireless communication, comprising:
    transmitting multiple data transmissions during at least one channel occupancy time (COT); and
    determining whether to adjust a contention window (CW) size based on feedback for the multiple data transmissions transmitted during the at least one COT.

20. The method of example 19, wherein a current CW size is maintained until all feedback is scheduled to be received for the multiple data transmissions during a COT.

21. The method of any of examples 19 or 20, wherein the CW size is adjusted to a minimum value when an ACK is received for any of the multiple data transmissions transmitted during a COT, and wherein the CW size is maintained until a last negative feedback is received when at least one NACK is received.

22. The method of any of examples 19 to 21, wherein the CW size is adjusted based on a first available feedback.

23. The method of example 22, further comprising:
    maintaining a contention window (CW) sequence that includes multiple entries and having a variable length, each entry having a CW value; and
    updating a last entry to the CW sequence based on the first available feedback for a data transmission during the COT.

24. The method of example 23, further comprising:
    increasing and tagging a value of the last entry of the CW sequence to form a tagged entry when the first available feedback comprises a NACK feedback.

25. The method of example 24, further comprising:
    updating the tagged entry or the tagged entry and subsequent entries based on the tagged entry when an ACK is received for a second data transmission in the COT.

26. The method of example 25, further comprising:
    ignoring subsequent ACK/NACK feedback for the COT for updating the CW sequence when the tagged entry is used to initiate a new COT.

27. The method of any of examples 25 or 26, wherein the CW sequence is updated based on subsequent ACK/NACK feedback for the COT when at least one of the subsequent entries following the tagged entry are not yet used to initiate a new COT.

28. The method of any of examples 25 to 27, wherein the subsequent entries comprise the subsequent entries whose CW value is determined based on the tagged entry.

29. The method of any of examples 19 to 28, wherein the CW size is increased to an increased CW size based on receiving a first feedback that is a NACK, and if an ACK is received, the increased CW size is reduced to a minimum value.

30. The method of any of examples 19 to 29, wherein when a plurality of feedback is received for different COTs, the plurality of feedback is processed based on an order of the different COTs associated with the plurality of feedback.

31. The method of any of examples 19 to 30, wherein a latest ACK/NACK feedback for a latest COT is used to determine whether to adjust the CW size.

32. The method of any of examples 19 to 31, wherein a CW update time is determined, and the ACK/NACK feedback for a COT associated with the CW update time is used to determine whether to adjust the CW size.

33. The method of example 32, wherein a most recent CW update time is determined, and the ACK/NACK feedback for the COT associated with the most recent CW update time is used to determine whether to adjust the CW size.

34. The method of any of examples 32 or 33, wherein the CW update time is determined based on a scheduling decision.

35. The method of example 34, wherein the CW update time is determined further based on one of processing delays or decoding delays.

36. The method of any of examples 33 to 35, wherein determining the CW update time or determining the most recent CW update time occurs when initiating a listen before talk process.

37. The method of any of examples 19 to 36, wherein when a plurality of feedback is received during a COT for different COTs, the plurality of feedback is processed in an order of arrival of each of the plurality of feedback.

38. The method of example 37, wherein the plurality of feedback is processed at an end of the COT.

39. The method of any of examples 19 to 38, wherein when a plurality of feedback is received for different COTs, the plurality of feedback is processed using a maximum delay time to determine which of the plurality of feedback to consider.

40. A method of wireless communication at a user equipment (UE), comprising:
transmitting a plurality of uplink transmissions in a channel occupancy time (COT);
monitoring for feedback within a period of time based on a delay value; and
determining whether to adjust a contention window (CW) size based at least in part on whether the feedback is received during the period of time based on the delay value.

41. The method of example 40, further comprising:
determining at least one reference transmission from the plurality of uplink transmissions transmitted by the UE;
if the feedback for the at least one reference transmission is received within the period of time based on the delay value, increasing the CW size when the feedback comprises a NACK, and maintaining the CW size or reducing the CW size when the feedback comprises an ACK; and
if the feedback is not received within the period of time, increasing the CW size.

42. The method of example 41, wherein the at least one reference transmission comprises a physical uplink shared channel (PUSCH) whose feedback is received earliest.

43. The method of any of examples 41 or 42, wherein if the feedback is not received within the period of time and the CW size is increased, the UE reduces the CW size when the ACK is received for the at least one reference transmission.

44. The method of any of examples 40 to 43, wherein the delay value comprises at least one of a preconfigured delay value, a configured delay value that is configured through radio resource control (RRC) downlink control information (DCI).

45. A method of wireless communication at a user equipment (UE), comprising:
receiving a grant that includes a code block group transmission information (CBG-TI), the CBG-TI having a CBG-TI value indicating which CBGs of a transport block (TB) are to be retransmitted by the UE; and
determining whether to adjust a contention window (CW) size based on the CBG-TI received by the UE.

46. The method of example 45, wherein the UE resets the CW size to a minimum CW size based on determining that the CBG-TI value for a CBG is changed from a previous CBG-TI value for the CBG.

47. The method of any of examples 45 or 46, wherein the UE increases the CW size based on determining that the CBG-TI requests retransmission of all CBGs that the UE transmitted previously.

48. The method of any of examples 45 to 47, wherein the UE resets the CW size based on determining that a TB size changes.

49. The method of any of examples 45 to 48, wherein the UE increases the CW size based on determining that a TB size changes.

50. A method of adjusting a contention window (CW) size by a wireless device at a user equipment (UE), comprising:
receiving downlink feedback information (DFI), the DFI including feedback information for a reference transmission used for a CW update; and adjusting a CW size based on the DFI.

51. The method of example 50, wherein the DFI includes feedback for a code block group (CBG) of a single uplink (SUL) Hybrid Automatic Repeat Request (HARQ) Identifier (ID) used for the CW update.

52. The method of any of examples 50 or 51, wherein the DFI includes a first feedback information for retransmission and a second feedback information for the CW update.

53. The method of example 52, wherein the first feedback information comprises TB level feedback, and the second feedback information comprises code block group (CBG) level feedback.

54. A method of adjusting a contention window (CW) size by a wireless device at a user equipment (UE), comprising:
receiving an uplink (UL) grant including an indication about whether the UE should reset the CW size based on reception by a base station of a previous uplink shared channel transmission; and determining whether to adjust the CW size based at least in part on the indication in the UL grant.

55. The method of example 54, wherein the indication is coded jointly with a listen before talk (LBT) type indication.

56. A method of wireless communication at a base station, comprising: determining whether an uplink transmission is received correctly from a UE; and
transmitting an uplink grant to the UE including an indication about whether the UE should reset a CW size based whether the base station received the uplink transmission correctly.

57. The method of example 56, wherein the indication is coded jointly with a listen before talk (LBT) type indication.

58. A method of adjusting a contention window (CW) size by a wireless device at a user equipment (UE), comprising:
transmitting, to a base station, information about a CW related parameter for the UE; and
receiving an uplink grant of resources for an uplink transmission, wherein a time between the uplink grant of resources and the uplink transmission is based at least in part on the CW related parameter for the UE.

59. The method of example 58, wherein the CW related parameter includes at least one of a CW size or information about a number of times that the UE has used a maximum CW size for a priority class.

60. A method of adjusting a contention window (CW) size by a wireless device at a base station, comprising:

receiving an information related to a CW related parameter from a user equipment (UE); and transmitting, to the UE, an uplink grant of resources for an uplink transmission, wherein a time between the uplink grant of resources and the uplink transmission is based at least in part on the CW related parameter for the UE.

61. The method of example 60, further comprising:

configuring the UE to provide the information related to the CW related parameter along with channel state information (CSI).

62. The method of any of examples 60 or 61, wherein the information related to the CW related parameter comprises at least one of a current CW value, or a number of times the UE has been at a maximum CW size (CW_max) for one or more priority classes.

63. An apparatus for wireless communication, comprising:

means for transmitting at least one data transmission during a channel occupancy time (COT); and means for determining a contention window (CW) size following the COT based on whether feedback for the at least one data transmission could be scheduled during the COT.

64. The apparatus of example 63, wherein the apparatus further comprises means to perform the method of any of examples 2-14.

65. An apparatus for wireless communication, comprising:

a memory; and at least one processor coupled to the memory and configured to perform the method of any of examples 1-14.

66. A computer-readable medium storing computer executable code, the code when executed by a processor cause the processor to perform the method of any of examples 1-14.

67. An apparatus for wireless communication, comprising:

means for maintaining a contention window (CW) sequence that includes multiple entries and having a variable length, each entry having a CW value;

means for transmitting at least one data transmission during a channel occupancy time (COT);

means for receiving feedback for the at least one data transmission;

means for updating the CW sequence based on the feedback for the at least one data transmission transmitted during the COT or after a time delay; and means for using a first entry in the CW sequence to perform a listen before talk (LBT) process.

68. The apparatus of example 67, wherein the apparatus further comprises means to perform the method of any of examples 16-18.

69. An apparatus for wireless communication, comprising:

a memory; and at least one processor coupled to the memory and configured to perform the method of any of examples 15-18.

70. A computer-readable medium storing computer executable code, the code when executed by a processor cause the processor to perform the method of any of examples 15-18.

71. An apparatus for wireless communication, comprising: means for transmitting multiple data transmissions during at least one channel occupancy time (COT); and means for determining whether to adjust a contention window (CW) size based on feedback for the multiple data transmissions transmitted during the at least one COT.

72. The apparatus of example 71, wherein the apparatus further comprises means to perform the method of any of examples 20-39.

73. An apparatus for wireless communication, comprising:

a memory; and at least one processor coupled to the memory and configured to perform the method of any of examples 19-39.

74. A computer-readable medium storing computer executable code, the code when executed by a processor cause the processor to perform the method of any of examples 19-39.

75. An apparatus for wireless communication, comprising:

means for transmitting a plurality of uplink transmissions in a channel occupancy time (COT);

means for monitoring for feedback within a period of time based on a delay value; and means for determining whether to adjust a contention window (CW) size based at least in part on whether the feedback is received during the period of time based on the delay value.

76. The apparatus of example 75, wherein the apparatus further comprises means to perform the method of any of examples 41-44.

77. An apparatus for wireless communication, comprising:

a memory; and at least one processor coupled to the memory and configured to perform the method of any of examples 40-44.

78. A computer-readable medium storing computer executable code, the code when executed by a processor cause the processor to perform the method of any of examples 40-44.

79. An apparatus for wireless communication, comprising:

means for receiving a grant that includes a code block group transmission information (CBG-TI), the CBG-TI having a CBG-TI value indicating which CBGs of a transport block (TB) are to be retransmitted by the UE; and means for determining whether to adjust a contention window (CW) size based on the CBG-TI received by the UE.

80. The apparatus of examples 79, wherein the apparatus further comprises means to perform the method of any of examples 46-49.

81. An apparatus for wireless communication, comprising:

a memory; and at least one processor coupled to the memory and configured to perform the method of any of examples 45-49.

82. A computer-readable medium storing computer executable code, the code when executed by a processor cause the processor to perform the method of any of examples 45-49.

83. An apparatus for wireless communication for adjusting a contention window (CW) size by a wireless device at a user equipment (UE), comprising:

means for receiving downlink feedback information (DFI), the DFI including feedback information for a reference transmission used for a CW update; and means for adjusting a CW size based on the DFI.

84. The apparatus of example 83, wherein the apparatus further comprises means to perform the method of any of examples 51-53.

85. An apparatus for wireless communication, comprising:
a memory; and
at least one processor coupled to the memory and configured to perform the method of any of examples 50-53.

86. A computer-readable medium storing computer executable code, the code when executed by a processor cause the processor to perform the method of any of examples 50-53.

87. An apparatus for wireless communication for adjusting a contention window (CW) size by a wireless device at a user equipment (UE), comprising:
means for receiving an uplink (UL) grant including an indication about whether the UE should reset the CW size based on reception by a base station of a previous uplink shared channel transmission; and
means for determining whether to adjust the CW size based at least in part on the indication in the UL grant.

88. The apparatus of example 87, wherein the apparatus further comprises means to perform the method of example 58.

89. An apparatus for wireless communication, comprising:
a memory; and
at least one processor coupled to the memory and configured to perform the method of any of examples 54-55.

90. A computer-readable medium storing computer executable code, the code when executed by a processor cause the processor to perform the method of any of examples 54-55.

91. An apparatus for wireless communication at a base station, comprising:
means for determining whether an uplink transmission is received correctly from a UE; and
means for transmitting an uplink grant to the UE including an indication about whether the UE should reset a CW size based whether the base station received the uplink transmission correctly.

92. The apparatus of example 91, wherein the apparatus further comprises means to perform the method of example 57.

93. An apparatus for wireless communication, comprising:
a memory; and
at least one processor coupled to the memory and configured to perform the method of any of examples 56-57.

94. A computer-readable medium storing computer executable code, the code when executed by a processor cause the processor to perform the method of any of examples 56-57.

95. An apparatus for wireless communication, comprising:
means for transmitting, to a base station, information about a CW related parameter for the UE; and
means for receiving an uplink grant of resources for an uplink transmission, wherein a time between the uplink grant of resources and the uplink transmission is based at least in part on the CW related parameter for the UE.

96. The apparatus of example 95, wherein the apparatus further comprises means to perform the method of example 59.

97. An apparatus for wireless communication, comprising:
a memory; and
at least one processor coupled to the memory and configured to perform the method of any of examples 58-59.

98. A computer-readable medium storing computer executable code, the code when executed by a processor cause the processor to perform the method of any of examples 58-59.

99. An apparatus for wireless communication for adjusting a contention window (CW) size by a wireless device at a base station, comprising:
means for receiving an information related to a CW related parameter from a user equipment (UE); and
means for transmitting, to the UE, an uplink grant of resources for an uplink transmission, wherein a time between the uplink grant of resources and the uplink transmission is based at least in part on the CW related parameter for the UE.

100. The apparatus of example 99, wherein the apparatus further comprises means to perform the method of any of examples 61-62.

101. An apparatus for wireless communication, comprising:
a memory; and
at least one processor coupled to the memory and configured to perform the method of any of examples 60-62.

102. A computer-readable medium storing computer executable code, the code when executed by a processor cause the processor to perform the method of any of examples 60-62.

What is claimed is:

1. A method of wireless communication, comprising:
transmitting a plurality of transmissions in a channel occupancy time (COT) during an ongoing listen-before-talk (LBT) process; and
applying a new contention window (CW) size or maintaining a current CW size during the ongoing LBT process based on whether the new CW size is longer or shorter than the current CW size, wherein the new CW size is determined based at least in part on whether feedback is received during a period of time based on a delay value.

2. The method of claim 1, wherein applying the new CW size is based on determining that feedback for at least one reference transmission of the plurality of transmissions being received within the period of time based on the delay value.

3. The method of claim 2, wherein applying the new CW size is further based on determining whether the feedback received within the period of time based on the delay value is acknowledgement or negative acknowledgement.

4. The method of claim 1, wherein applying the new CW size includes determining the new CW size as a reduced CW size based on determining that feedback for at least one reference transmission of the plurality of transmissions is received within the period of time based on the delay value, and based on determining that the feedback is acknowledgement.

5. The method of claim 4, wherein applying the new CW size includes determining the new CW size as a determined minimum CW size.

6. The method of claim 1, wherein applying the new CW size includes determining the new CW size as an increased CW size based on determining that feedback for at least one reference transmission of the plurality of transmissions is received within the period of time based on the delay value, and based on determining that the feedback is negative acknowledgement.

7. The method of claim 1, wherein applying the new CW size includes determining the new CW size as an increased CW size based on determining that feedback for at least one reference transmission of the plurality of transmissions is not received within the period of time based on the delay value.

8. The method of claim 1, wherein applying the new CW size is based on a latest ACK/NACK feedback for a latest COT.

9. The method of claim 1, wherein applying the new CW size includes restarting the ongoing LBT process using the new CW size when the new CW size is shorter than the current CW size.

10. The method of claim 1, further comprising determining a new backoff counter value for the ongoing LBT process using the new CW size.

11. The method of claim 10, wherein the new backoff counter value is determined based on the new CW size.

12. The method of claim 1, wherein the plurality of transmissions include physical uplink shared channel (PUSCH) transmissions.

13. The method of claim 1, wherein the plurality of transmissions include physical downlink shared channel (PDSCH) transmissions.

14. The method of claim 10, wherein the new backoff counter value is determined based on a new random backoff based on the new CW size.

15. The method of claim 10, wherein the new backoff counter value is determined based on a prior random backoff that was based on a previous CW size.

16. An apparatus for wireless communication, comprising:
a memory; and
at least one processor coupled to the memory and configured to:
transmit a plurality of transmissions in a channel occupancy time (COT) during an ongoing listen-before-talk (LBT) process; and
apply a new contention window (CW) size or maintain a current CW size during the ongoing LBT process based on whether the new CW size is longer or shorter than the current CW size, wherein the new CW size is determined based at least in part on whether feedback is received during a period of time based on a delay value.

17. The apparatus of claim 16, wherein the at least one processor is configured to apply the new CW size based on determining that feedback for at least one reference transmission of the plurality of transmissions being received within the period of time based on the delay value.

18. The apparatus of claim 17, wherein the at least one processor is configured to apply the new CW size further based on determining whether the feedback received within the period of time based on the delay value is acknowledgement or negative acknowledgement.

19. The apparatus of claim 16, wherein the at least one processor is configured to apply the new CW size as a reduced CW size based on determining that feedback for at least one reference transmission of the plurality of transmissions is received within the period of time based on the delay value, and based on determining that the feedback is acknowledgement.

20. The apparatus of claim 19, wherein the at least one processor is configured to apply the new CW size as a determined minimum CW size.

21. The apparatus of claim 16, wherein the at least one processor is configured apply the new CW size as an increased CW size based on determining that feedback for at least one reference transmission of the plurality of transmissions is received within the period of time based on the delay value, and based on determining that the feedback is negative acknowledgement.

22. The apparatus of claim 16, wherein the at least one processor is configured to apply the new CW size as an increased CW size based on determining that feedback for at least one reference transmission of the plurality of transmissions is not received within the period of time based on the delay value.

23. The apparatus of claim 16, wherein the at least one processor is configured to apply the new CW size based on a latest ACK/NACK feedback for a latest COT.

24. The apparatus of claim 16, wherein the at least one processor is configured to apply the new CW size at least in part by restarting the ongoing LBT process using the new CW size when the new CW size is shorter than the current CW size.

25. The apparatus of claim 16, wherein the at least one processor is further configured to determine a new backoff counter value for the ongoing LBT process using the new CW size.

26. The apparatus of claim 25, wherein the at least one processor is configured to determine the new backoff counter value based on at least one of the new CW size, a new random backoff based on the new CW size, or a prior random backoff that was based on a previous CW size.

27. An apparatus for wireless communication, comprising:
means for transmitting a plurality of transmissions in a channel occupancy time (COT) during an ongoing listen-before-talk (LBT) process; and
means for applying a new contention window (CW) size or maintaining a current CW size during the ongoing LBT process based on whether the new CW size is longer or shorter than the current CW size, wherein the new CW size is determined based at least in part on whether feedback is received during a period of time based on a delay value.

28. The apparatus of claim 27, wherein the means for applying applies the new CW size based on determining that feedback for at least one reference transmission of the plurality of transmissions being received within the period of time based on the delay value.

29. A non-transitory computer-readable medium, comprising code executable by one or more processors for wireless communication, the code comprising code for:
transmitting a plurality of transmissions in a channel occupancy time (COT) during an ongoing listen-before-talk (LBT) process; and
applying a new contention window (CW) size or maintaining a current CW size during the ongoing LBT process based on whether the new CW size is longer or shorter than the current CW size, wherein the new CW size is determined based at least in part on whether feedback is received during a period of time based on a delay value.

30. The non-transitory computer-readable medium of claim 29, wherein the code for applying applies the new CW size based on determining that feedback for at least one reference transmission of the plurality of transmissions being received within the period of time based on the delay value.

* * * * *